(12) United States Patent
Avery et al.

(10) Patent No.: US 7,766,184 B2
(45) Date of Patent: Aug. 3, 2010

(54) COLLAPSIBLE PAN

(75) Inventors: Phillip L. Avery, Bethlehem, PA (US); Daniel Lee Bizzell, Davidson, NC (US); Ian Kovacevich, Charlotte, NC (US); Jason Honeycutt, Charlotte, NC (US)

(73) Assignee: Edison Nation, LLC, Charlotte, NC (US)

( * ) Notice: Subject to any disclaimer, the term of this patent is extended or adjusted under 35 U.S.C. 154(b) by 0 days.

(21) Appl. No.: 12/617,388

(22) Filed: Nov. 12, 2009

(65) Prior Publication Data

US 2010/0133142 A1    Jun. 3, 2010

Related U.S. Application Data

(60) Provisional application No. 61/119,026, filed on Dec. 1, 2008, provisional application No. 61/178,993, filed on May 17, 2009.

(51) Int. Cl.
*B65D 69/00* (2006.01)

(52) U.S. Cl. .................. 220/573.1; 206/557; 220/6; 99/449

(58) Field of Classification Search ............... 99/449, 99/426, 432, DIG. 15; 206/557; 220/574, 220/6, 912, 573.1, 573.2
See application file for complete search history.

(56) References Cited

U.S. PATENT DOCUMENTS 6,684,760 B1    2/2004   Rajusth

*Primary Examiner*—Ehud Gartenberg
*Assistant Examiner*—Raven Collins
(74) *Attorney, Agent, or Firm*—Chad D. Tillman; James D. Wright; Tillman Wright, PLLC

(57) ABSTRACT

A collapsible pan includes a base portion, a plurality of side portions, and a flexible connector for connecting each of the side portions to the base portion along edges thereof. Each of the plurality of side portions is configured to be pivotable relative to the base portion, thereby permitting adjustment between a use configuration, whereby each of the plurality of side portions is arranged generally upright relative to the base portion, and a collapsed configuration, whereby each of the plurality of side portions is arranged to lay generally flat relative to the base portion.

10 Claims, 31 Drawing Sheets

COLLAPSIBLE PAN

CROSS-REFERENCE TO RELATED APPLICATIONS

The present application is a U.S. nonprovisional patent application of, and claims priority under 35 U.S.C. §119(e) to, U.S. provisional patent application Ser. No. 61/119,026, filed Dec. 1, 2008. The present application is also a U.S. nonprovisional patent application of, and claims priority under 35 U.S.C. §119(e) to, U.S. provisional patent application Ser. No. 61/178,993, filed May 17, 2009. Each of the foregoing patent applications is expressly incorporated by reference herein. A copy of U.S. provisional patent application Ser. No. 61/178,993, filed May 17, 2009, is attached hereto as Appendix A, which is likewise expressly incorporated by reference herein.

COPYRIGHT STATEMENT

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

BACKGROUND OF THE INVENTION

The present invention generally relates to baking devices and, more particularly to an improved baking pan that is configured to be collapsible.

Baking pans and related baking accessories come in a wide variety of shapes and sizes. In many cases, baking pans are sized to accommodate the specific food item to be prepared. Bread loaf pans typically have higher side walls with a small base to accommodate for the rising process during baking Casserole and cake pans are often longer and wider at the base with shorter side walls to accommodate a larger quantity of the desired food item to be prepared therein. Baking sheets typically have a wide, flat base portion in order to provide an optimal baking surface. As many individuals are likely to possess a combination of differently sized pans for use in connection with various food items, pan storage can become an issue. Differently sized pans typically do not stack well with one another and, thus, often occupy significant shelf space. Accordingly, a need exists for collapsible baking pans having varying shapes and sizes that can be stored and maintained easily within a relatively small space.

In addition to the foregoing, a need exists for a collapsible pan that can be assembled for use and disassembled for storage with relative ease. Moreover, a need exists for a collapsible pan that is sturdy and durable when assembled in a use configuration. Still further, a need exists for a collapsible pan that can provide effective uniform heat distribution throughout the pan surface for even baking These, and other needs, are addressed by one or more aspects of the present invention.

SUMMARY OF THE INVENTION

The present invention includes many aspects and features. Moreover, while many aspects and features relate to, and are described in, the context of collapsible pans and related assemblies, the present invention is not limited to use only in collapsible pans, as will become apparent from the following summaries and detailed descriptions of aspects, features, and one or more embodiments of the present invention.

Broadly defined, the present invention according to one aspect includes a collapsible pan having a base portion and a plurality of side portions interconnected with the base portion at edges thereof. The side portions are configured to be pivotable relative to the base portion so as to permit adjustment of the collapsible pan between a use configuration, whereby the side portions are arranged generally upright relative to the base portion to define a partial enclosure having a baking surface and a heat distribution surface, and a collapsed configuration, whereby the side portions are arranged to lay generally flat relative to the base portion.

In features of this aspect, the baking surface may include silicone; the heat distribution surface may be a metal surface; the metal surface may include aluminum; each of the baking surface and the heat distribution surface may be a plastic surface; the plastic surfaces may each include a synthetic polymer; and the synthetic polymer may be nylon 6,6.

In other features of this aspect, the collapsible pan may further comprise a plurality of tabs at opposite ends of the side portions for attaching adjacent side portions together; the side portions may be releasably attached together so as to permit quick release of the tabs, thereby freeing the side portions for pivotable adjustment; and the heat distribution surface may be absent along the edges of the base portion where the side portions interconnect therewith.

Broadly defined, the present invention according to another aspect includes a collapsible pan adjustable between a use configuration and a collapsed configuration.

Broadly defined, the present invention according to still another aspect includes a baking kit having a carrier having an interior shelf and a baking pan adjustable between a use configuration and a collapsed configuration. The baking pan is adapted for storage within the carrier when in the collapsed configuration.

Broadly defined, the present invention according to still another aspect includes a carrier adapted for storing a plurality of collapsible pans. The carrier includes an enclosure, a plurality of interior shelves, and a cover adaptable for use as a baking sheet.

Broadly defined, the present invention according to still another aspect includes a collapsible pan substantially as shown and described.

Broadly defined, the present invention according to still another aspect includes a carrier substantially as shown and described.

Broadly defined, the present invention according to still another aspect includes a collapsible muffin pan substantially as shown and described.

Broadly defined, the present invention according to still another aspect includes a collapsible pan that includes a base plate, a plurality of side plates, and a flexible web to interconnect the base plate with the respective side plates at edges thereof. The flexible web facilitates pivotable movement of the side plates relative to the base plate, thereby permitting adjustment of the collapsible pan between a use configuration, whereby the side plates are arranged generally upright relative to the base plate to define a partial enclosure, and a collapsed configuration, whereby the side plates are arranged to lay generally flat relative to the base plate.

In features of this aspect, the web may include a silicone-based polymer; the web may include silicone; the plates may include a metal material; the metal material may be aluminum; the collapsible pan may further include a plurality of tabs at ends of the side plates for attaching adjacent side plates together; the side plates may be releasably attached together so as to permit quick release of the tabs, thereby freeing the side portions for pivotable adjustment; the web may be co-molded with the base plate and the side plates; and the web may be overmolded with respect to the base plate and the side plates.

Broadly defined, the present invention according to still another aspect includes a method of manufacturing a collapsible pan that includes the steps of providing a base plate and one or more side plates and injection molding a web composed of a polymer relative to the one or more plates to interconnect the base plate with the one or more side plates at an edge thereof.

In features of this aspect, the method may further include the step of insert molding the base plate and the one or more side plates; the step of injection molding a web may include overmolding the web relative to the base plate and one or more side plates; and the step of injection molding a web may include co-molding the web with the base plate and one or more side plates.

Broadly defined, the present invention according to still another aspect includes a method of manufacturing a collapsible pan substantially as shown and described.

Broadly defined, the present invention according to still another aspect includes a collapsible pan that includes a base portion, a plurality of side portions, and a flexible connector for connecting each of the side portions to the base portion along edges thereof. Each of the plurality of side portions is configured to be pivotable relative to the base portion, thereby permitting adjustment between a use configuration, whereby each of the plurality of side portions is arranged generally upright relative to the base portion, and a collapsed configuration, whereby each of the plurality of side portions is arranged to lay generally flat relative to the base portion.

In features of this aspect, the flexible connector may be comprised of a synthetic polymer; the synthetic polymer may be a silicone-based polymer; the collapsible pan may further comprise a plurality of plates positioned at each of the base portion and the plurality of side portions; each of the plurality of plates may be comprised of a metal-based material; and the metal-based material may include aluminum.

In further features of this aspect, the collapsible pan may further comprise a plurality of tabs at opposite ends of at least some of the plurality of side portions for attaching adjacent side portions together in the use configuration; adjacent side portions may be releasably attached together when in the use configuration so as to permit quick release of the tabs, thereby freeing the plurality of side portions for pivotable adjustment; an interior baking surface of each of the base portion and the plurality of side portions may be comprised of a synthetic polymer; and the synthetic polymer may be a silicone-based polymer.

Broadly defined, the present invention according to still another aspect includes a collapsible pan that includes a base plate, a plurality of side plates, and a flexible web connecting each of the plurality of side plates to the base plate along edges thereof. The flexible web facilitates pivotable movement of each of the plurality of side plates relative to the base plate, thereby permitting adjustment between a use configuration, whereby each of the plurality of side plates is arranged generally upright relative to the base plate, and a collapsed configuration, whereby each of the plurality of side plates is arranged to lay generally flat relative to the base plate.

In features of this aspect, the flexible web may be comprised of a synthetic polymer; the synthetic polymer may be a silicone-based polymer; the plates may be comprised of a metal-based material; the metal-based material may include aluminum; the flexible web may include a plurality of tabs arranged between adjacent side plates for connecting adjacent side plates with one another; and each of the plurality of tabs may be configured to fold upon itself and attach to one of the adjacent side plates so as to releasably secure the plurality of side plates in an upright position relative to the base plate when in the use configuration.

In another feature of this aspect, at least one of the base plate and the plurality of side plates may be mechanically bonded to the flexible web. In still another feature of this aspect, at least one of the base plate and the plurality of side plates may be chemically bonded to the flexible web.

Broadly defined, the present invention according to still another aspect includes a collapsible pan that includes a base plate, a plurality of side plates, and a flexible web comprised of a synthetic polymer for connecting each of the plurality of side plates to the base plate along edges thereof and including a plurality of tabs arranged between adjacent side plates for connecting adjacent side plates with one another. The flexible web facilitates pivotable movement of each of the plurality of side plates relative to the base plate, thereby permitting adjustment between a use configuration, whereby each of the plurality of side plates is arranged generally upright relative to the base plate, and a collapsed configuration, whereby each of the plurality of side plates is arranged to lay generally flat relative to the base plate. Each of the plurality of tabs is configured to fold upon itself and attach to one of the adjacent side plates so as to releasably secure the plurality of side plates in an upright position relative to the base plate when in the use configuration.

In addition to the aforementioned aspects and features of the present invention, it should be noted that the present invention further encompasses the various possible combinations and subcombinations of such aspects and features.

BRIEF DESCRIPTION OF THE DRAWINGS

One or more preferred embodiments of the present invention now will be described in detail with reference to the accompanying drawings, which are not necessarily to scale, wherein the same elements are referred to with the same reference numerals, and wherein.

DETAILED DESCRIPTION

Figure 1:
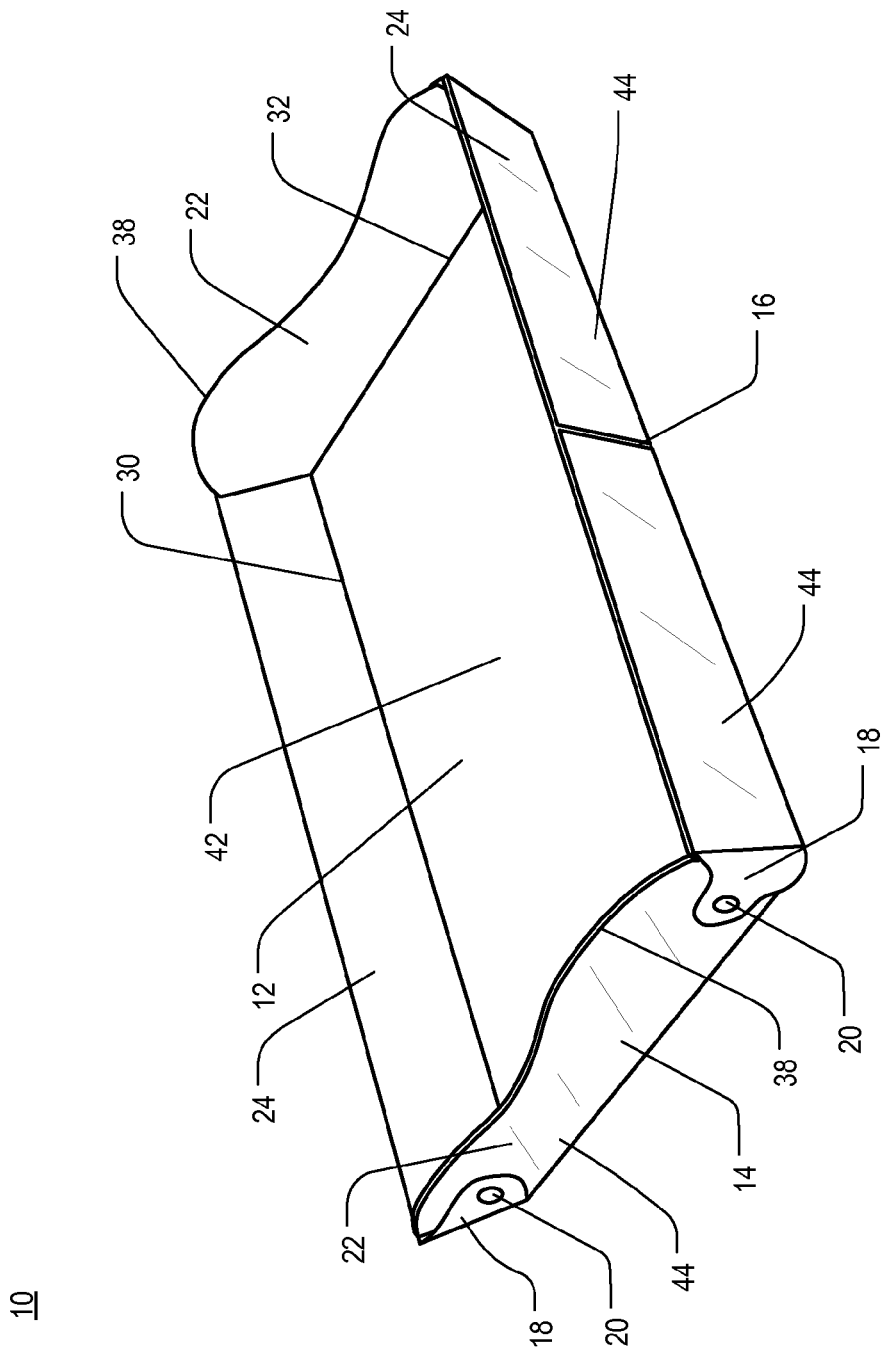
FIG. 1 is a perspective view of a first embodiment of a collapsible pan in accordance with one or more preferred embodiments of the present invention.

As a preliminary matter, it will readily be understood by one having ordinary skill in the relevant art ("Ordinary Artisan") that the present invention has broad utility and application. Furthermore, any embodiment discussed and identified as being "preferred" is considered to be part of a best mode contemplated for carrying out the present invention. Other embodiments also may be discussed for additional illustrative purposes in providing a full and enabling disclosure of the present invention. Moreover, many embodiments, such as adaptations, variations, modifications, and equivalent arrangements, will be implicitly disclosed by the embodiments described herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is to be construed, to limit the scope of patent protection afforded the present invention, which scope is to be defined by the claims and the equivalents thereof. It is not intended that the scope of patent protection afforded the present invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection afforded the present invention is to be defined by the appended claims rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at least one of the items," but does not exclude a plurality of items of the list. Thus, reference to "a picnic basket having cheese or crackers" describes "a picnic basket having cheese without crackers", "a picnic basket having crackers without cheese", and "a picnic basket having both cheese and crackers." Finally, when used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

Referring now to the drawings, one or more preferred embodiments of the present invention are next described. The following description of one or more preferred embodiments is merely exemplary in nature and is in no way intended to limit the invention, its implementations, or uses.

FIG. 1 is a perspective view of an embodiment of a collapsible pan 10 in accordance with one or more preferred embodiments of the present invention. FIG. 1 depicts a collapsible pan 10 arranged in a use configuration having a generally rectangular base portion 12 and four side portions 22,24 connected with the base portion 12 along edges 30,32 thereof. When in the use configuration, the collapsible pan 10 may be used in connection with baking a wide variety of foods in a conventional baking oven. Upper edges 38 of at least some of the side portions may be curved to provide a location by which the collapsible pan 10 may be gripped when in the use configuration. In a preferred embodiment, shown in FIG. 1, upper edges 38 of opposite side portions 22 of the rectangular pan shape are curved. While the collapsible pan 10 of FIG. 1 is shown with a generally rectangular shape, it is also within the scope of the present invention for the collapsible pan in accordance with one or more preferred embodiments to have any of a range of possible shapes and sizes.

Figure 2:
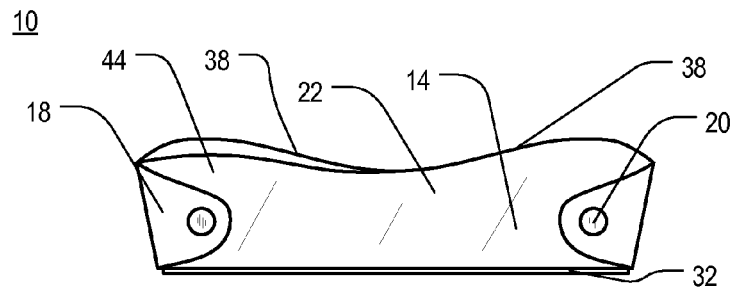
FIG. 2 is a side view of the collapsible pan of FIG. 1, shown in a use configuration.
Figure 3:
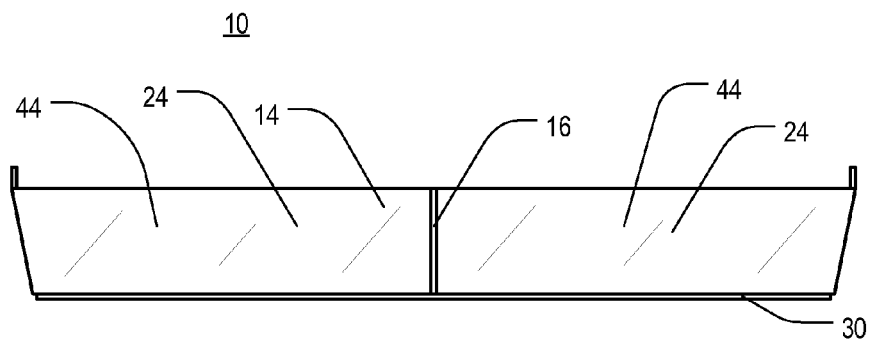
FIG. 3 is a front side view of the collapsible pan of FIG. 2.
Figure 4:
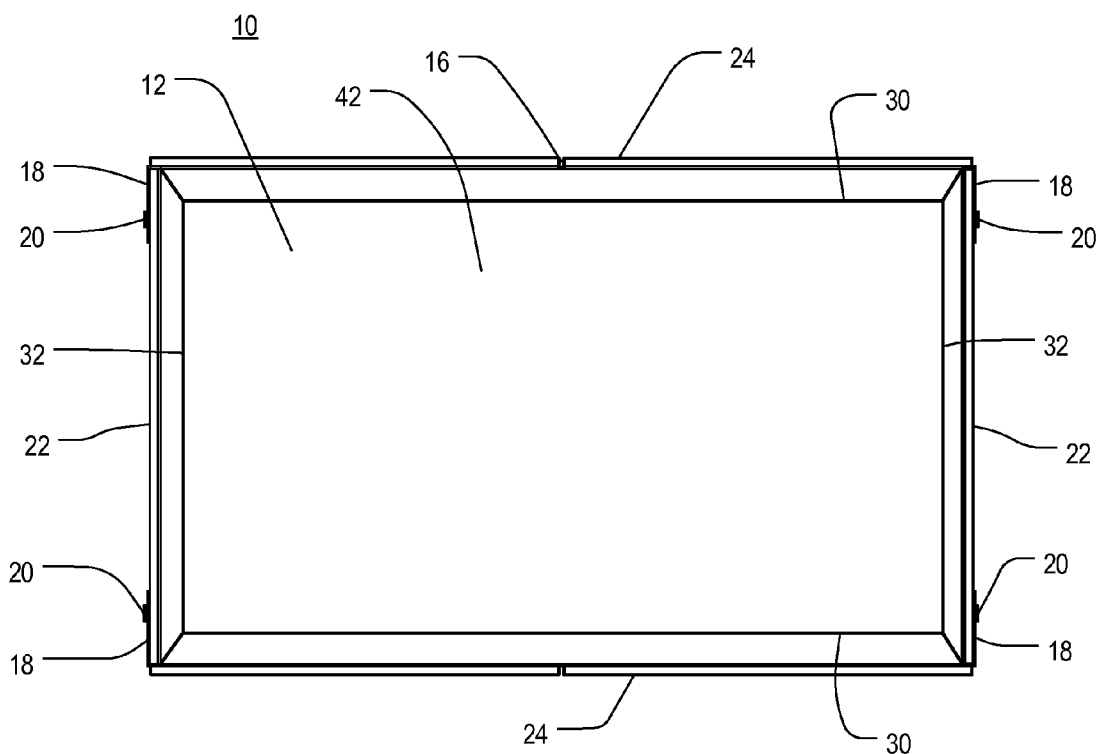
FIG. 4 is a top view of the collapsible pan of FIG. 2.

FIG. 2 is a side view of the collapsible pan 10 of FIG. 1, shown in the use configuration; FIG. 3 is a front side view of the collapsible pan 10 of FIG. 2; and FIG. 4 is a top view of the collapsible pan 10 of FIG. 2. As shown in FIGS. 1-4, the collapsible pan 10 further includes connection tabs 18 located at both ends of side portions 24. The connection tabs 18 are configured for releasable attachment at corresponding attachment pins 20 at both ends of side portions 22. As will be explained in greater detail below, securement of the connection tabs 18 of side portions 24 to the attachment pins 20 of side portions 22 releasably retains the collapsible pan 10 in the use configuration.

The collapsible pan 10 in the use configuration defines a partial enclosure having a baking surface 42 arranged interiorly of the pan 10 and a heat distribution surface 14 arranged exteriorly of the pan 10. In a preferred embodiment, the baking surface 42 is advantageously comprised of silicone so as to provide a durable, flexible, and non-stick surface for baking The heat distribution surface 14 is preferably comprised of a metal material such as aluminum so as to facilitate even distribution of heat during baking As shown in FIGS. 1-4, the baking surface 42 is shown as a solid silicone cover that extends throughout the interior of the collapsible pan 10, including the interior sides of the base portion 12 and the side portions 22,24. As further shown in FIGS. 1-4, the heat distribution surface 14 may be comprised of a plurality of plates 44 situated on the exterior sides of the base portion 12 and the side portions 22,24. As will be explained in greater detail below, the use of separate plates 44 for the heat distribution surface may further enhance baking quality. Furthermore, the plates 44 provide structure and durability to the collapsible pan 10 when arranged for use. In a preferred embodiment, each of the plates 44 is made of aluminum.

In addition to the foregoing, it is further contemplated that the heat distribution surface 14, and specifically the plates 44, may be composed of a plastic material, such as a synthetic polymer. In a preferred embodiment, the synthetic polymer that may be used is nylon 6,6. In this regard, the collapsible pan 10 may be used in a microwave setting. Furthermore, it is contemplated that each of the baking surface 42 and the heat distribution surface 14 be composed of a synthetic polymer, such as nylon 6,6.

Figure 6:
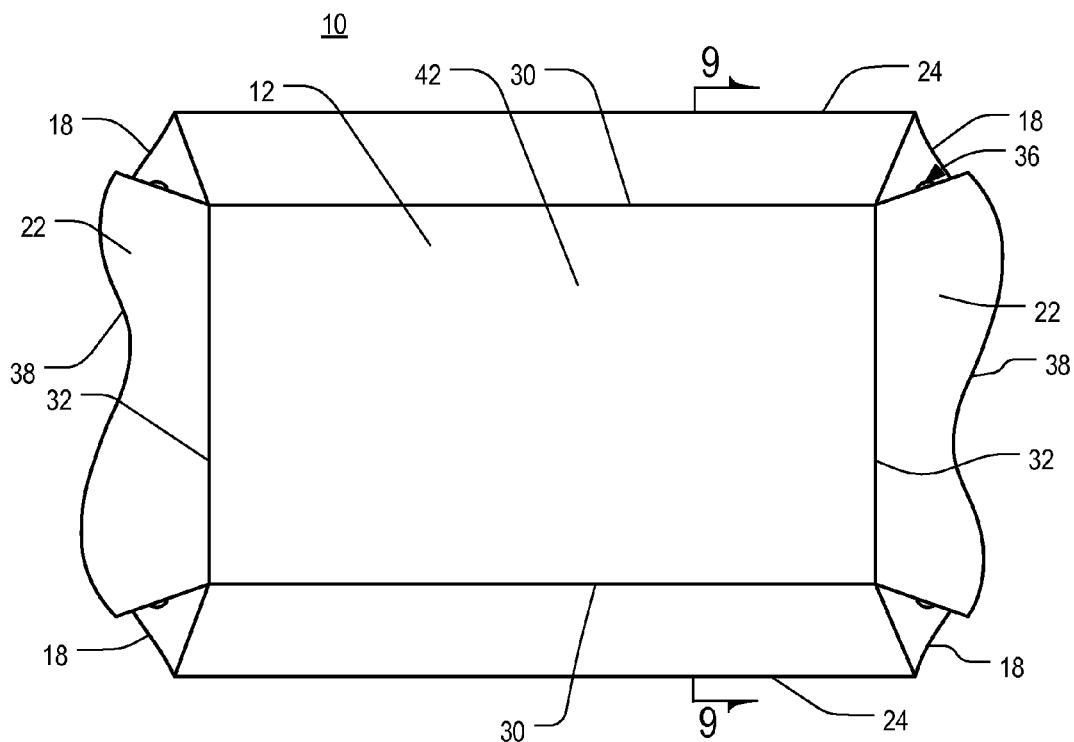
FIG. 6 is a top view of the collapsible pan of FIG. 5.
Figure 9:
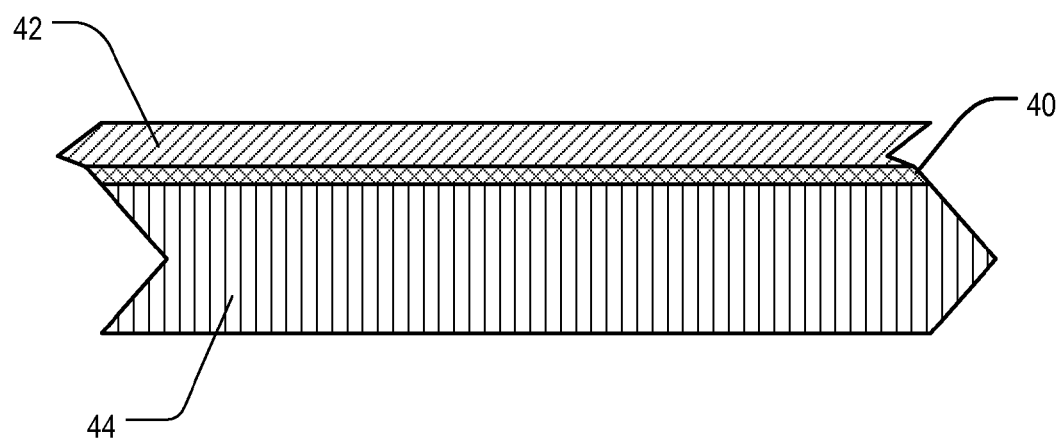
FIG. 9 is a fragmentary side cross-sectional view of a portion of the collapsible pan of FIG. 6 taken along line 9-9.

FIG. 9 is a fragmentary side cross-sectional view of a portion of the collapsible pan of FIG. 6 taken along line 9-9. As shown in FIG. 9, the plates 44 of the heat distribution surface 14 and the baking surface 42 may be attached together with an adhesive 40 or other bonding agent. While a range of adhesive materials may be used, the adhesive 40 is preferably selected so as to be functional in a high heat environment such as would be common in a baking oven.

Figure 5:
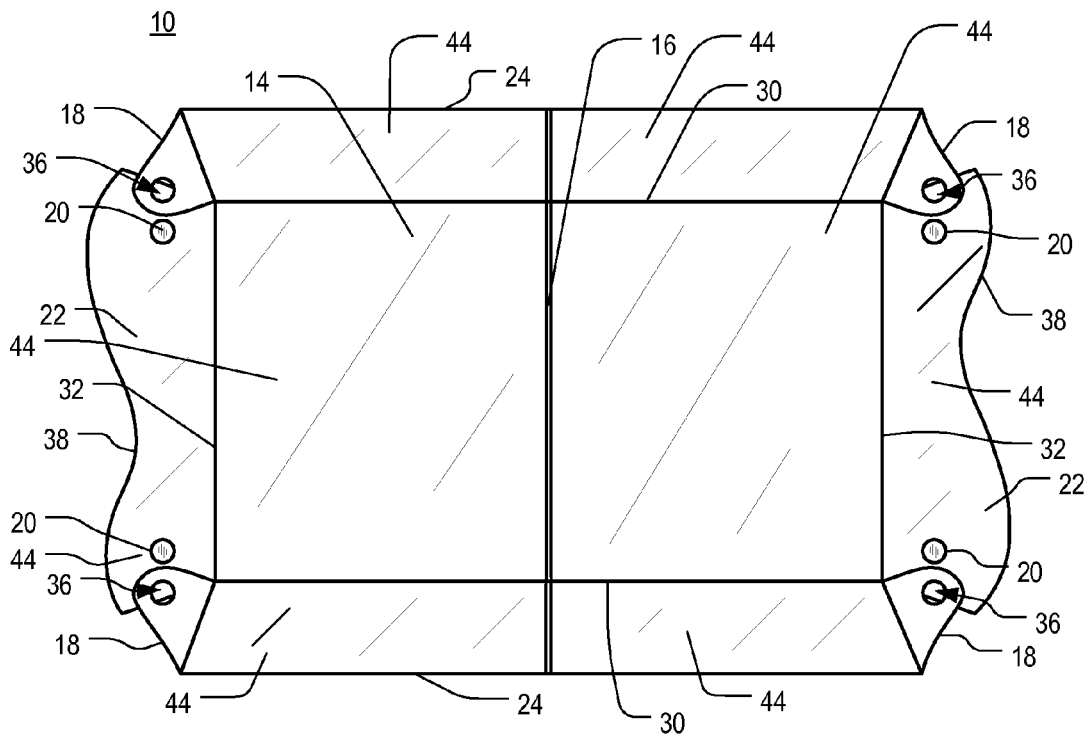
FIG. 5 is a bottom view of the collapsible pan of FIG. 1, shown in a collapsed configuration.

FIG. 5 is a bottom view of the collapsible pan 10 of FIG. 1, shown in the collapsed configuration, and FIG. 6 is a top view of the collapsible pan 10 of FIG. 5. FIGS. 5 and 6 depict the collapsible pan 10 in a collapsed configuration. In the collapsed configuration, each of the four side portions 22,24 are released from one another and lay generally flat relative to the base portion 12. Moreover, when in the collapsed configuration, the collapsible pan 10 is generally flat. As shown in FIG. 6, the connection tabs 18 extend at both ends of oppositely positioned side portions 24. In order to permit the connection tabs 18 to have flexibility, no plate 44 is adhered to the connection tabs 18. As such, in a preferred embodiment, the connection tabs 18 are comprised of silicone.

As further shown in FIGS. 5-6, an aperture 36 is arranged in each of the connection tabs 18. The apertures 36 correspond generally to the attachment pins 20 located at both ends of the exterior side of oppositely positioned side portions 22. In this regard, the attachment pins 20 of side portions 22 are configured for placement within the apertures 36 of the connection tabs 18 of adjacent side portions 24. When the attachment pins 20 are placed within the corresponding apertures 36 of the connection tabs 18, the collapsible pan 10 is converted from the collapsed configuration to the use configuration. As shown in FIGS. 1-4, the side portions 22,24 bend along the edges 30,32 where each is connected with the base portion 12 to be in a generally upright position to define four walls of the collapsible pan 10. Because each edge 30,32 is also an intersection point in between adjacent plates 44, the edges 30,32 may function as a hinge about which the side portions 22,24 pivot to be adjusted between the collapsed configuration and the use configuration.

As shown in FIGS. 1-6, the side portions 22,24 are releasably attached to one another by means of an attachment pin 20 configured for placement in corresponding apertures 36 of the connection tabs 18. It is also contemplated that other mechanisms of attachment may be used to attach the side portions 22,24 together, including, but not limited to clasps, snaps, clips, and pressure fit holes.

As discussed above, the edges 30,32 where the side portions 22,24 connect with the base portion 12 of the collapsible pan 10 function as a hinge about which the side portions 22,24 may pivot. Specifically, the edges 30,32 provide a location where separate, adjacently-positioned plates 44 of the heat distribution surface 14 abut one another. As such, no plate 44 is specifically arranged along the edges 30,32. In this regard, the absence of the plates 44 of the heat distribution surface 14 along the edges 30,32 of the collapsible pan 10 facilitates greater heat along the edges 30,32 during baking Higher heat along the edges 30,32 thereby provides the food item being baked with crisp corner edges where the food item contacted the edges 30,32 of the collapsible pan 10 during baking Crisp corners in food items such as cakes and bread loaves typically complement the overall baking process, whereby the baked food item can be removed from the collapsible pan 10 with ease.

Additionally, the collapsible pan 10 may be released quickly to permit adjustment from the use configuration to the collapsed configuration. As discussed above, the baking surface 42 is preferably comprised of a durable, flexible material, such as silicone, that extends as a solid cover throughout the entire baking surface 42. As such, when the side portions 22,24 are attached together when the collapsible pan 10 is in the use configuration, tension exists in the baking surface 42 along edges 30,32 that urges the side portions 22,24 to adjust downward to lay flat relative to the base portion 12. Placement of the attachment pins 20 in corresponding apertures 36 of the connection tabs 18 provides sufficient structure to the collapsible pan 10 to overcome the natural tension in the baking surface 42 along edges 30,32, thereby preventing the collapsible pan 10 from collapsing during baking Once baking is complete, the natural tension in the baking surface 42 along edges 30,32 permits the collapsible pan 10 to be quickly released from the use configuration to the collapsed configuration. An inward pushing force applied to both side portions 22 of the collapsible pan 10 removes the attachment pins 20 from the corresponding apertures 36 of the connection tabs 18, thereby permitting the natural tension in the baking surface to pull the side portions 22,24 downward to lay generally flat relative to the base portion 12. In this manner, once baking is complete, the collapsible pan 10 may be quickly and easily converted from the use configuration to the collapsed configuration, thereby leaving the baked food item resting on the base portion 12 and free from the side portions 22,24. Accordingly, the baked food item may be removed easily from the collapsible pan 10, and the collapsible pan 10 may be cleaned and prepared for storage.

Advantageously, because the collapsible pan 10 in the collapsed configuration provides a flat, relatively seamless surface, the collapsible pan 10 does not have difficult-to-reach corners as in conventional pans, where crumbs and grime typically accumulate in a pan after use. In this regard, the collapsible pan 10 in the collapsed configuration is easier to clean than conventional pans. Additionally, when in the collapsed configuration, the collapsible pan 10 has a relatively flat shape and, thus, may be more easily placed into a conventional dishwasher.

Figure 7:
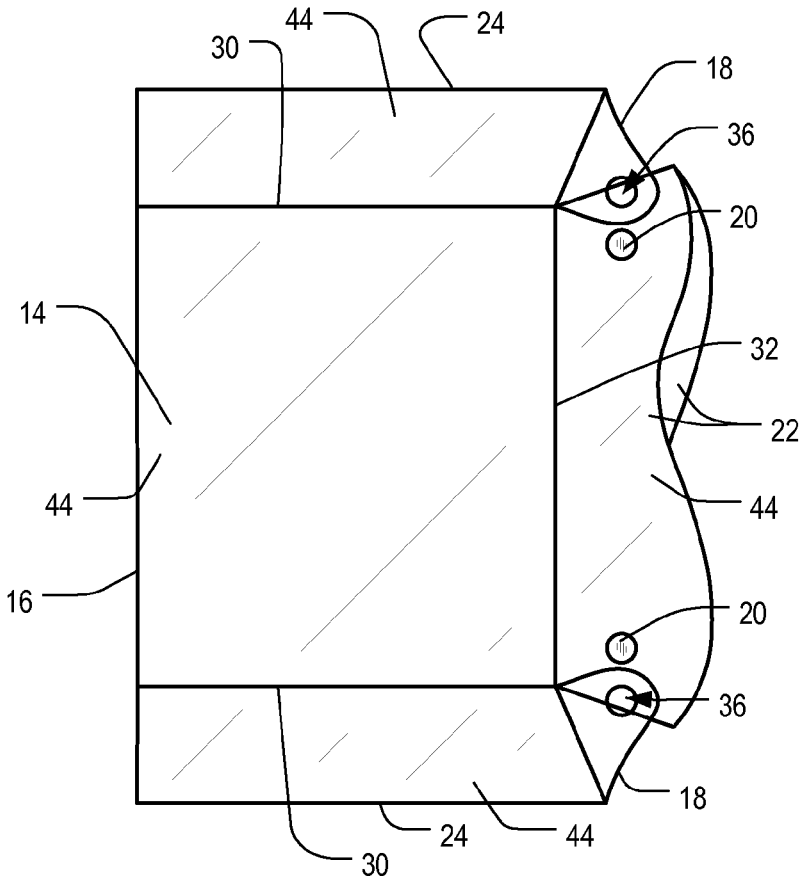
FIG. 7 is a top view of the collapsible pan of FIG. 5, folded in half.
Figure 8:
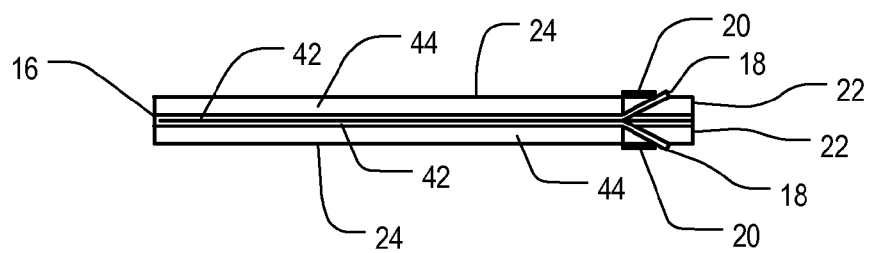
FIG. 8 is a side view of the collapsible pan of FIG. 7.

FIG. 7 is a top view of the collapsible pan 10 of FIG. 5, folded in half, and FIG. 8 is a side view of the collapsible pan 10 of FIG. 7. As shown in FIG. 5 and FIGS. 7-8, the collapsible pan 10 may further include a seam 16 that extends across the length or width of the collapsible pan 10 at the heat distribution surface 14. As shown specifically in FIG. 5, the seam 16 preferably extends across both the base portion 12 and the immediately adjoining side portions 24. In particular, separate, adjacently-positioned plates 44 of the heat distribution surface 14 abut one another along the seam 16 at each of the base portion 12 and the two immediately adjoining side portions 24. The absence of the plates 44 along the seam 16 leaves the baking surface 42 without the corresponding heat distribution surface 14 at the seam 16. As the baking surface 42 is preferably a durable, flexible material, such as silicone, the collapsible pan 10 may be folded when in the collapsed configuration along the seam 16. As shown in FIGS. 7-8, folding of the collapsible pan 10 along the seam 16 reduces the size of the collapsible pan 10 even further so as to permit storage of the collapsible pan 10 in even smaller locations. While a single seam 16 is shown in FIGS. 6-8, it is contemplated that the collapsible pan 10 may have multiple seams in several locations to facilitate additional folding. In a preferred embodiment, the collapsible pan 10 has an overall thickness of ⅛ inch or less when in the collapsed configuration. Thus, when folded in half as shown in FIGS. 7-8, the collapsible pan 10 preferably has an overall thickness of ¼ inch or less.

Figure 10:
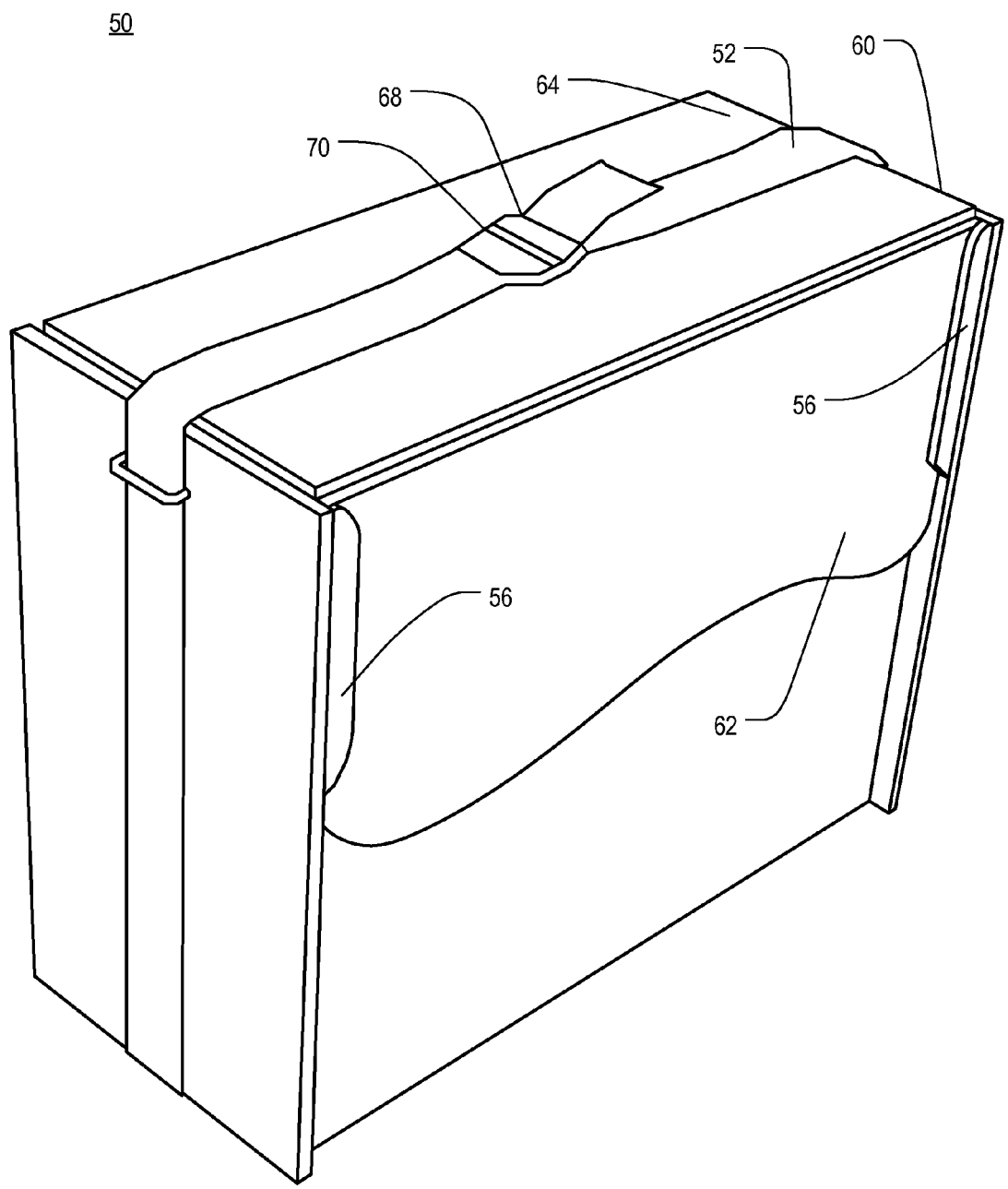
FIG. 10 is a perspective view of an embodiment of a collapsible pan carrier in accordance with one or more preferred embodiments of the present invention.

FIG. 10 is a perspective view of an embodiment of a collapsible pan carrier 50 in accordance with one or more preferred embodiments of the present invention. The collapsible pan carrier 50 is configured with a baking sheet lid 60 and a retaining strap 52 for securing the baking sheet lid 52 to the carrier 50 and providing the carrier 50 with a handle by which the carrier 50 may be transported. Groove plates 56 at either side of both ends of the carrier 50 permit side portions 62 of the baking sheet lid 52 to be slid into place over the carrier 50. A central portion 64 of the baking sheet lid 52 is thereby retained in covering position on the carrier 50. In this regard, the carrier 50 may be transported with relative ease.

The retaining strap 52 may be selectively adjusted to any desired length. In some embodiments, the retaining strap may be adjusted in length to be used as a hand grip to permit the carrier 50 to be carried by hand or as a shoulder strap to permit the carrier 50 to be carried over a user's shoulder. In this regard, the retaining strap 62 includes an adjustment mechanism 68 to permit selective adjustment of the length of the retaining strap 62. While the adjustment mechanism 68 may include a wide range of possible adjustment devices, in one contemplated embodiment, the adjustment mechanism is a slider 70 through which an end of the retaining strap is engaged.

Figure 11:
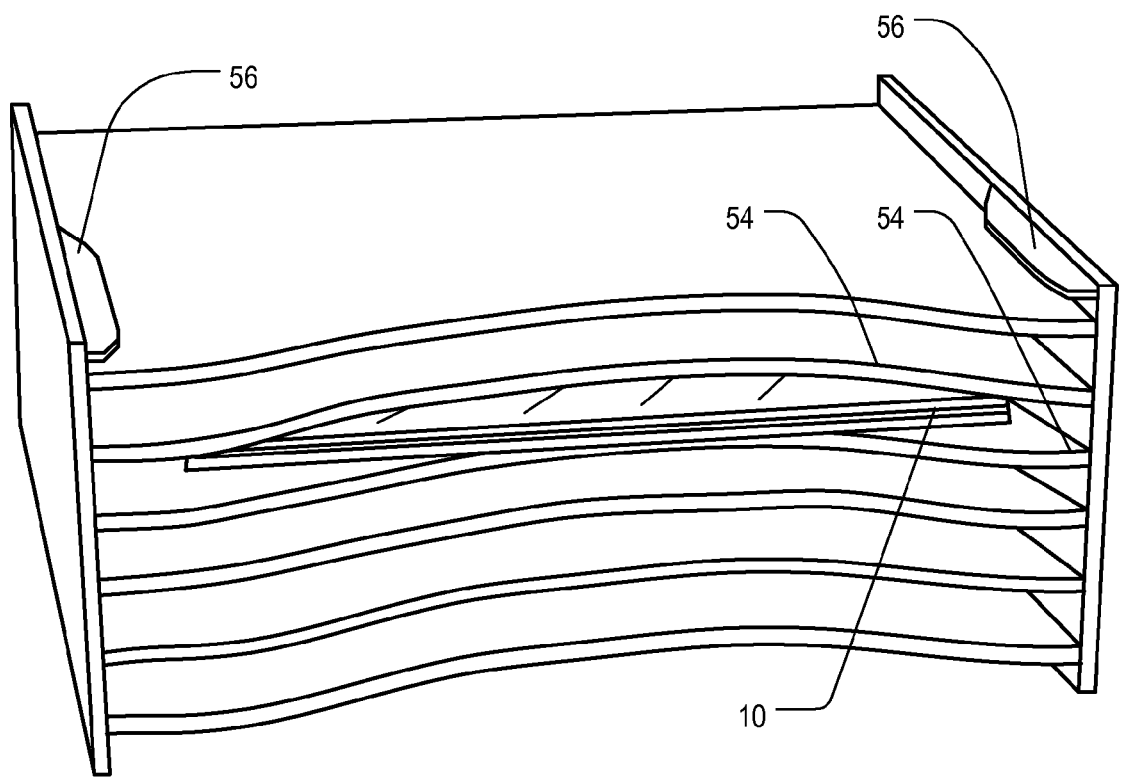
FIG. 11 is a perspective view of the collapsible pan carrier of FIG. 10, shown with the baking sheet lid removed.

FIG. 11 is a perspective view of the collapsible pan carrier 50 of FIG. 10, shown with the baking sheet lid 60 removed. As shown in FIG. 11, the baking sheet lid 60 of the carrier 50 may be unstrapped and removed from the carrier 50. The carrier 50 may then be arranged on its side to reveal the contents stored therein. Interiorly, the carrier 50 includes a plurality of shelves 54, each configured for supporting a collapsible pan 10 in the collapsed configuration. Shelves 54 may be sized to accommodate collapsed pans of varying sizes and shapes. Shelves 54 may further accommodate a collapsible pan 10 that has been folded one or more times. In this regard, the carrier 50 may be arranged as a shelf rack to facilitate accessibility to any collapsible pans stored therein for ease of use. Furthermore, the carrier 50, when arranged on its side as shown in FIG. 11, provides an aesthetically pleasing appearance if arranged for use within a home. Advantageously, when the retaining strap 52 is removed and the carrier 50 is placed on its side, the carrier 50 can function as a table top or support surface for supporting pans or other miscellaneous cooking articles.

Figure 12:
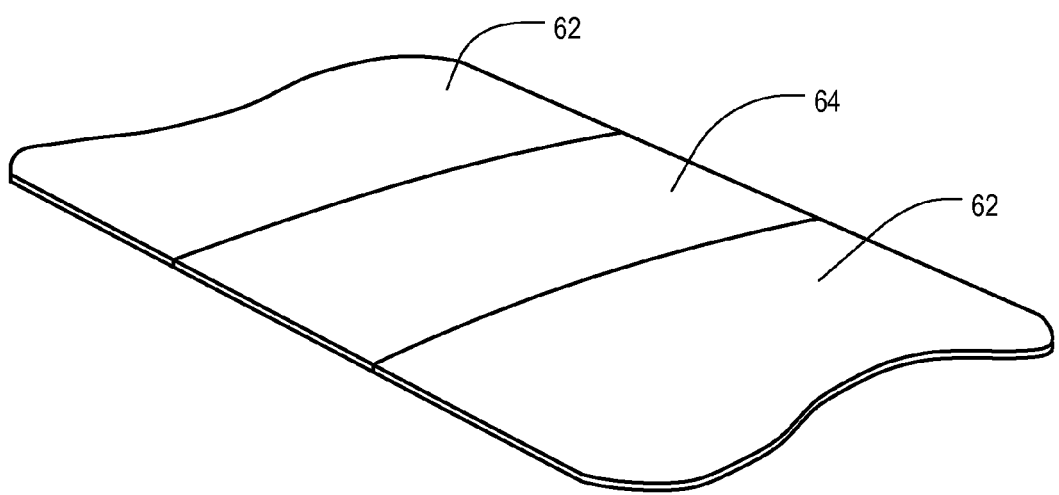
FIG. 12 is a perspective view of the baking sheet lid of the collapsible pan carrier of FIG. 10, shown in a use configuration.

FIG. 12 is a perspective view of the baking sheet lid 60 of the collapsible pan carrier 50 of FIG. 10, shown in a use configuration. When removed from the carrier 50, the baking sheet lid 60 may be configured for use as a baking sheet. The baking sheet lid 60 includes a central portion 64 and two side portions 62 attached at either end of the central portion 64. The baking sheet lid 60 may further be configured to have a baking surface on one side thereof and a heat distribution surface on the other side thereof. In this regard, the baking surface of the baking sheet lid 60 may be comprised of silicone, and the heat distribution surface may be comprised of aluminum plates placed to correspond with each of the central portion 64 and the side portions 62. In this regard, the plates would not interfere with folding of the side portions 62 relative to the central portion 64 when configuring the baking sheet lid 60 in covering position on the carrier 50. In another preferred embodiment, each of the baking surface and the heat distribution surface of the baking sheet lid 60 are comprised of silicone. In another preferred embodiment, both the baking surface and the heat distribution surface of the baking sheet lid 60 are plastic surfaces made from a synthetic polymer, such as nylon 6,6. In still another preferred embodiment, the baking surface of the baking sheet lid 60 is comprised of silicone, and the heat distribution surface of the baking sheet lid 60 is comprised of a synthetic polymer, such as nylon 6,6.

As shown in FIGS. 10 and 12, the side portions 62 of the baking sheet lid 60 are configured for pivotable adjustment relative to the central portion 64. In this regard, the baking sheet lid 60 may be folded to a smaller size for storage. Furthermore, as specifically shown in FIG. 10, the baking sheet lid 60 may be folded so as to cover the carrier 50 when adapted for long term storage or transportation. When folded to a smaller size, the baking sheet lid 60 is advantageously sized to be stored in one of the shelves 54 of the carrier 50 when the carrier 50 is in use as a shelf rack.

Figure 13:
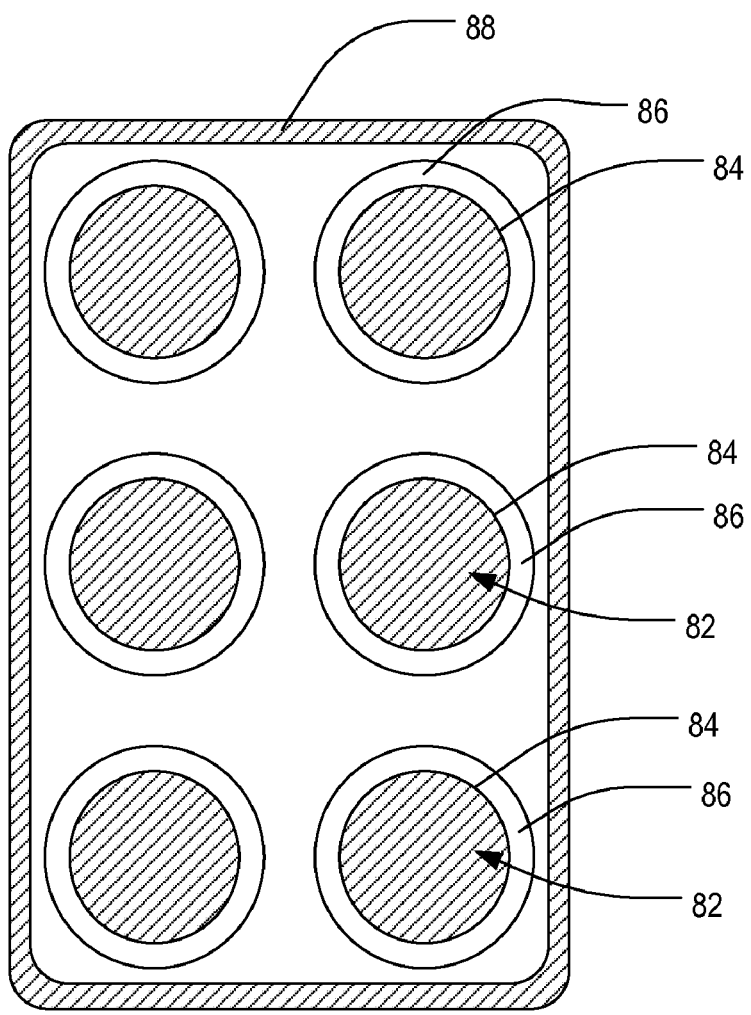
FIG. 13 is a bottom view of a collapsible muffin pan, shown in a use configuration, in accordance with one or more preferred embodiments of the present invention.
Figure 14:
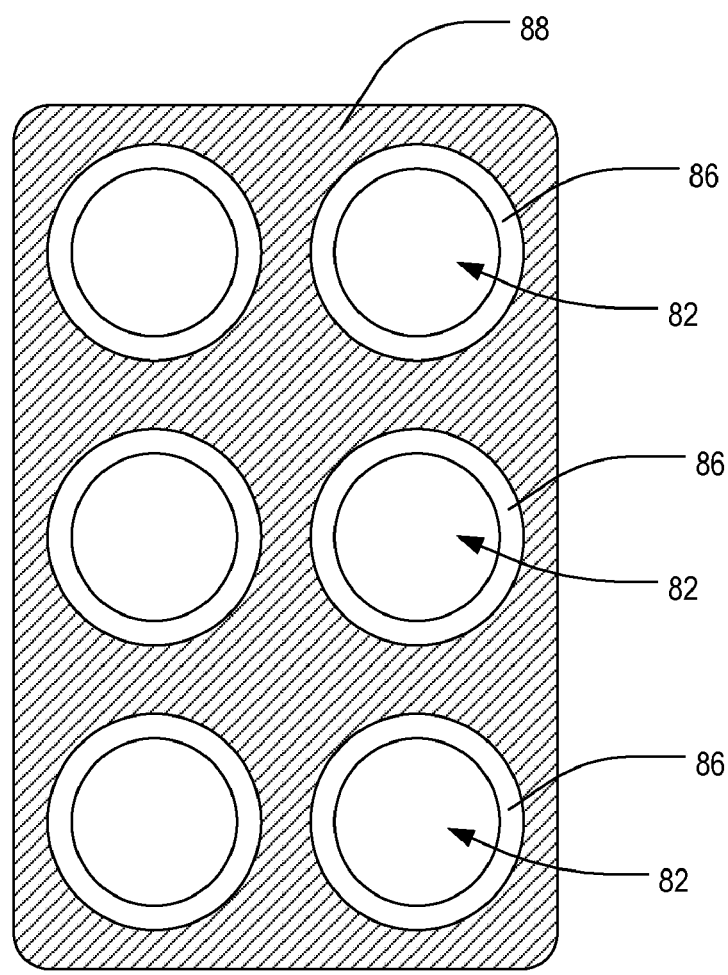
FIG. 14 is a top view of the collapsible muffin pan of FIG. 13, shown in a use configuration.
Figure 15:
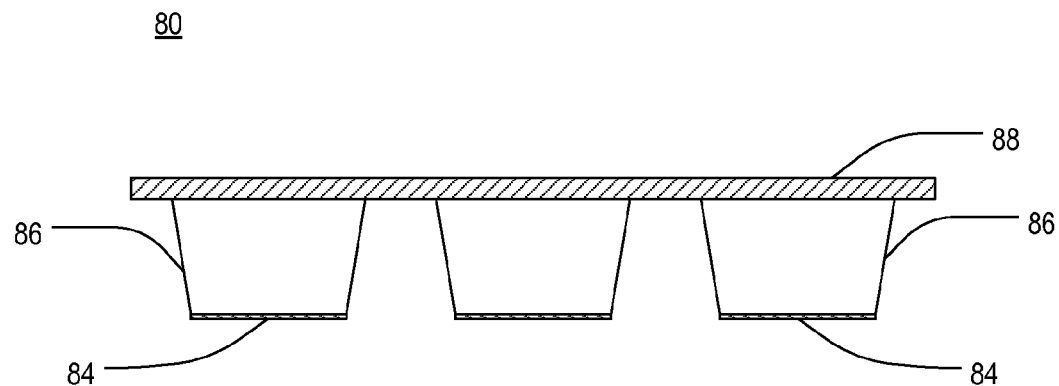
FIG. 15 is a side view of the collapsible muffin pan of FIG. 13, shown in a use configuration.
Figure 16:
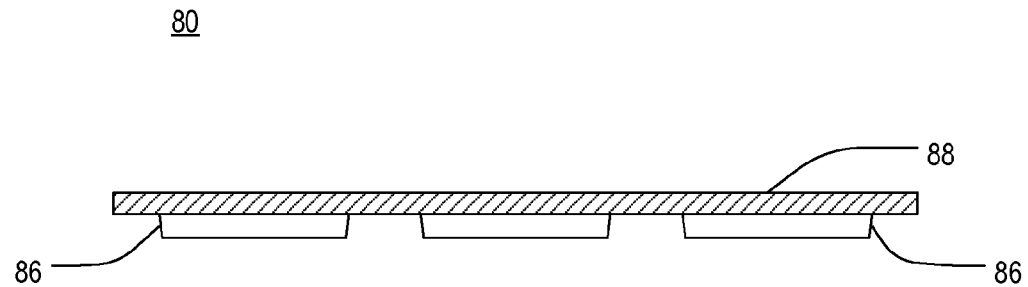
FIG. 16 is a side view of the collapsible muffin pan of FIG. 13, shown in a collapsed configuration.

FIG. 13 and FIG. 14 are respective bottom and top views of a collapsible muffin pan 80, shown in a use configuration, in accordance with one or more preferred embodiments of the present invention. FIG. 15 is a side view of the collapsible muffin pan 80 of FIG. 13, shown in the use configuration, and FIG. 16 is a side of the collapsible muffin pan 80 of FIG. 13, shown in a collapsed configuration. The collapsible muffin pan 80 includes a plurality of wells 82 that are configured to be collapsible inwardly to be relatively flat against a top surface 88 of the pan 80. As shown in FIGS. 13-16, each well 82 has a plate 84 positioned exteriorly of the well 82 and at the bottom thereof to provide a bottom surface that may be heated during the baking process.

Additionally, as shown in FIGS. 15-16, each well 82 has flexible sidewalls 86 that may be collapsed inwardly. It is contemplated that the sidewalls 86 may be collapsed inwardly in an accordion-like manner such that the wells 82 lay nearly flat against the top surface of the muffin pan 80. Advantageously, when in the collapsed configuration shown in FIG. 16, the muffin pan 80 may be stored in a much smaller space. In a preferred embodiment, the sidewalls 86 of the muffin pan 80 are composed of a silicone-based material that provides flexibility to the pan and performs well in a high heat environment such as a baking oven. Additionally, the interior bottom surface of each of the wells 82 may be covered in a silicone-based material such that the entire interior portion of each of the wells 82 is composed of the silicone-based material. In this regard, the interior surface of each of the wells 82 may be a non-stick surface to facilitate the removal of muffins or other food items from the muffin pan 80 upon completion of the baking process.

Figure 17:
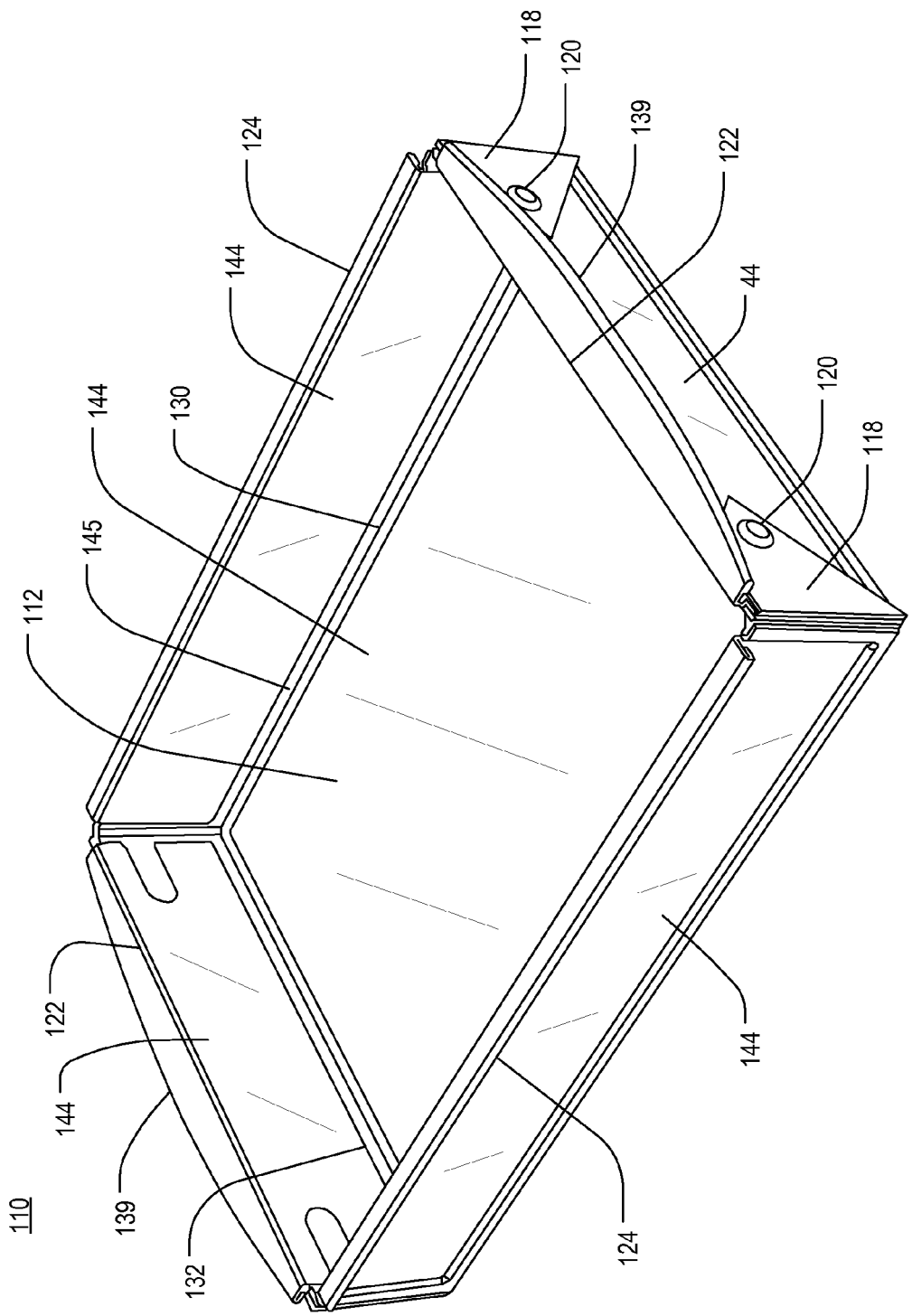
FIG. 17 is a perspective view of a second embodiment of a collapsible pan in accordance with one or more preferred embodiments of the present invention.

FIG. 17 is a perspective view of another embodiment of a collapsible pan 110 in accordance with one or more preferred embodiments of the present invention. FIG. 17 depicts a collapsible pan 110 arranged in a use configuration having a generally rectangular base portion 112 and four side portions 122,124 extending from the base portion 112. The side portions 122, 124 are bendable at edges 130,132 thereof that connect each side portion 122, 124 with the base portion 112. When in the use configuration, the collapsible pan 110 may be used in connection with baking a wide variety of foods in a conventional baking oven. While the collapsible pan 110 of FIG. 17 is shown with a generally rectangular shape, it is also within the scope of the present invention for the collapsible pan in accordance with one or more preferred embodiments to have any of a range of possible shapes and sizes.

Upper edges 139 of at least some of the side portions 122,124 may extend outwardly from the collapsible pan 110 to provide a location by which the collapsible pan 110 may be gripped when in the use configuration. As shown in FIG. 17, upper edges 139 of opposite side portions 122 of the rectangular pan shape extend outwardly and have a curved edge to provide a hand grip for the collapsible pan 110.

Figure 18:
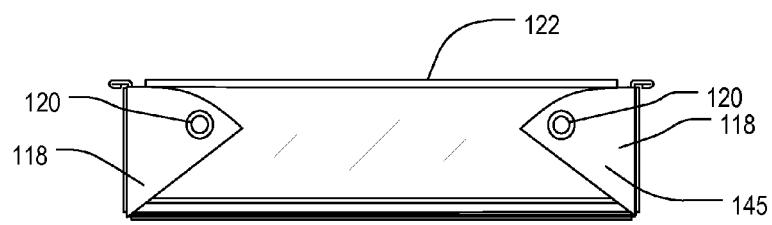
FIG. 18 is a side view of the collapsible pan of FIG. 17, shown in a use configuration.
Figure 19:
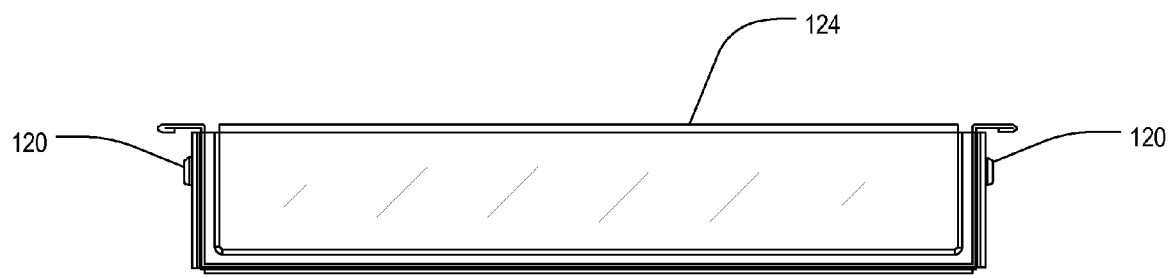
FIG. 19 is a front side view of the collapsible pan of FIG. 18.
Figure 20:
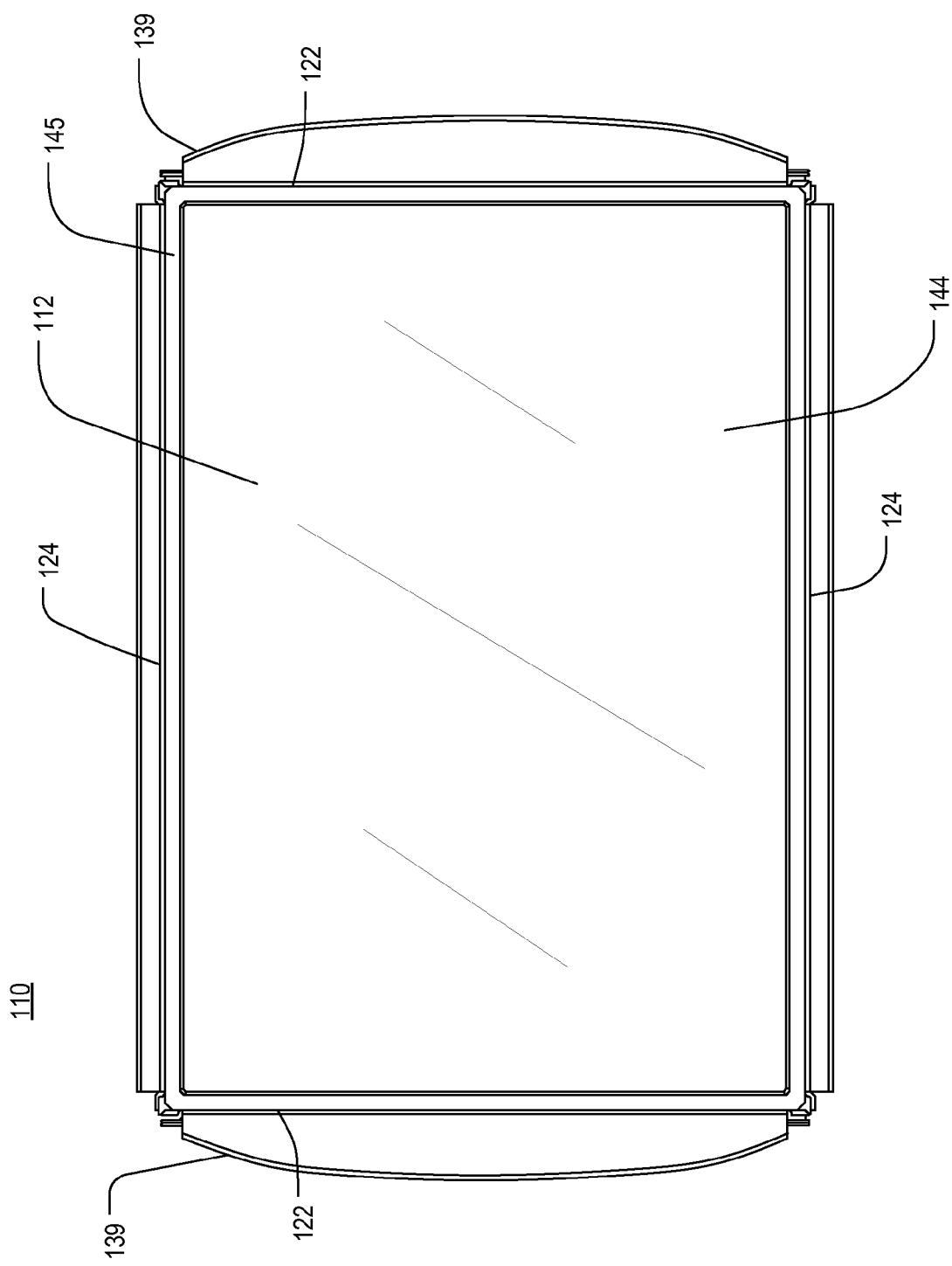
FIG. 20 is a top view of the collapsible pan of FIG. 18.

FIG. 18 is a side view of the collapsible pan 110 of FIG. 17, shown in the use configuration; FIG. 19 is a front side view of the collapsible pan 110 of FIG. 17; and FIG. 20 is a top view of the collapsible pan 110 of FIG. 17. As shown in FIGS. 17-20, the collapsible pan 110 further includes connection tabs 118 located at ends of side portions 122,124. In a preferred embodiment, the connection tabs 118 are flexible connectors that connect adjacent side portions 122,124 of the collapsible pan 110 together. The connection tabs 118 are configured for releasable attachment at corresponding attachment pins 120 at ends of side portions 122. In this regard, the side portion 122,124 may be bended upwardly at edges 130, 132 relative to the base portion 112 and each connection tab 118 may be folded back upon itself and attached to a corresponding attachment pin 120 to assemble the collapsible pan 110 in the use configuration, thereby defining the partial enclosure of a baking pan. As will be explained in greater detail below, securement of the connection tabs 118 of side portions 122,124 to the attachment pins 120 of side portions 122 releasably retains the collapsible pan 110 in the use configuration such that the collapsible may be readily converted between the use configuration and the collapsed configuration.

Figure 21:
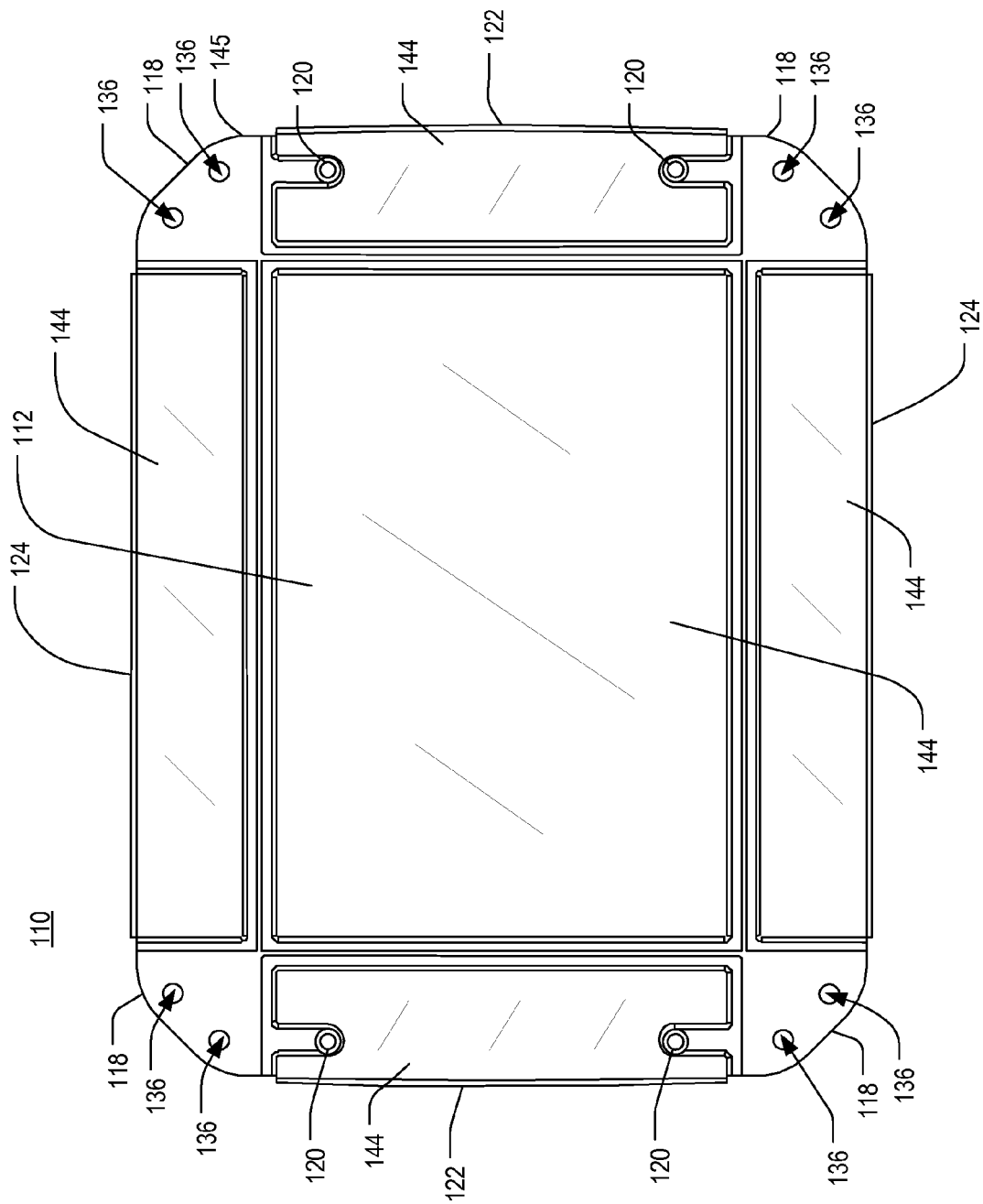
FIG. 21 is a bottom view of the collapsible pan of FIG. 17, shown in a collapsed configuration.
Figure 22:
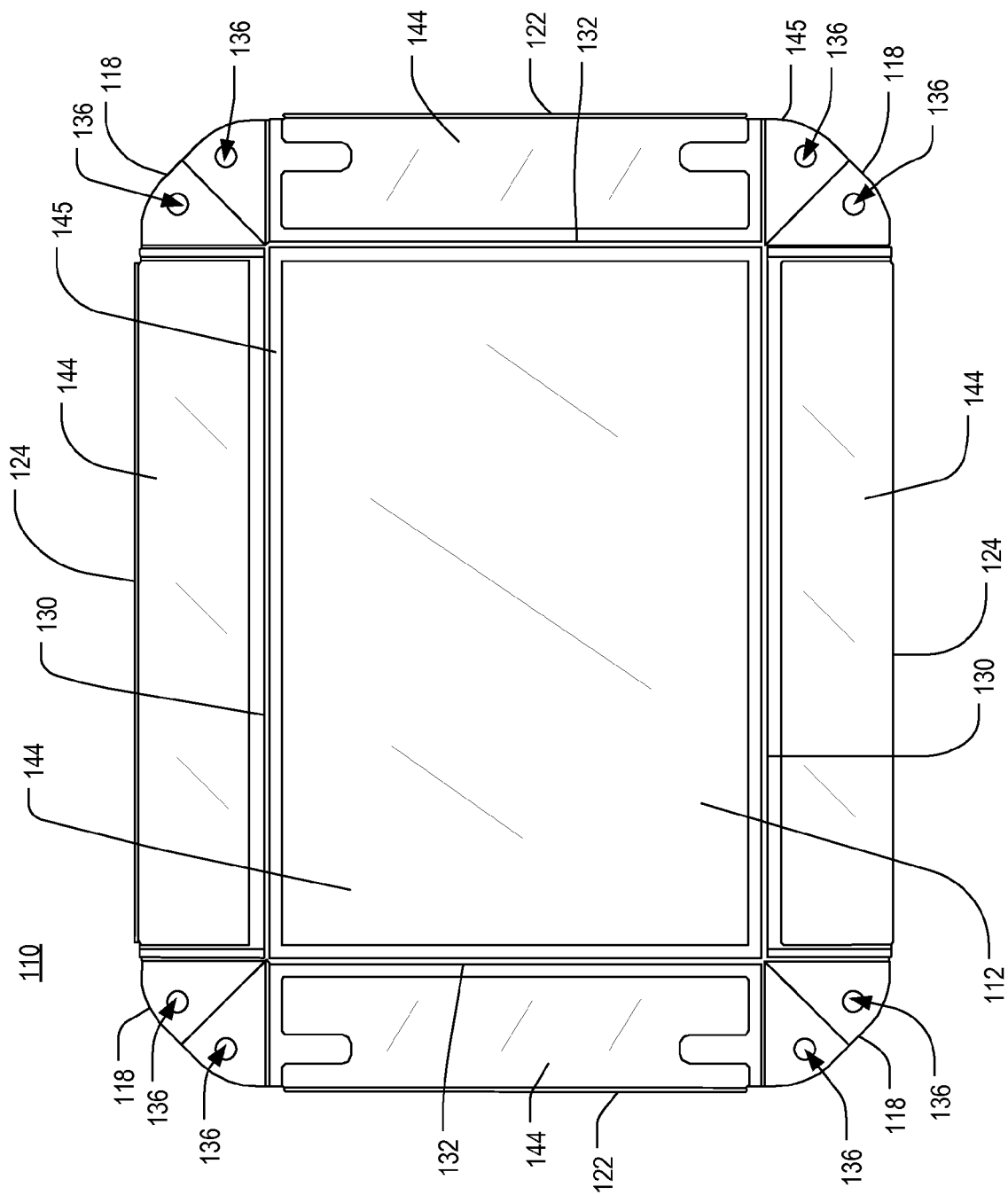
FIG. 22 is a top view of the collapsible pan of FIG. 21.

FIG. 21 is a bottom view of the collapsible pan 110 of FIG. 17, shown in the collapsed configuration, and FIG. 22 is a top view of the collapsible pan 110 of FIG. 17. FIGS. 21 and 22 depict the collapsible pan 110 in a collapsed configuration. In the collapsed configuration, the connection tabs 118 are released from the corresponding attachment pins 120 and the side portions 122,124 lay generally flat relative to the base portion 112. Moreover, when in the collapsed configuration, the collapsible pan 110 is generally flat. As shown in FIGS. 21-22, the collapsible pan 110 is formed of a plurality of rigid plates 144 that form the base portion 112 and the side portions 122,124. The plates 144 provide structure and durability to the collapsible pan 110 when arranged for use. In a preferred embodiment, each of the plates 144 is composed of a metal-based material, such as aluminum or aluminum-based materials. While the collapsible pan 110 is shown with a single plate 144 corresponding to each of the side portions 122,124 and the base portion 112, it is contemplated that multiple plates could be used to form each of the side portions 122,124 and the base portion 112.

The plates 144 are held together with a durable, flexible material, such as a synthetic polymer. In a preferred embodiment, the material holding the plates 144 together is a silicone polymer. While a range of polymers may be used in connection with the present invention, polymers should be selected for use in a high heat environment such as would be common in a baking oven. Advantageously, silicone polymers are understood to function well in a high heat environment and provide a non-stick surface to foods.

In a preferred embodiment, and as shown in FIGS. 17-22, the plates 144 are held together with a polymer-based web 145 composed of a synthetic polymer such as a silicone-based polymer, which provides the collapsible pan 110 with durability and flexibility to transition between the use configuration and the collapsed configuration. The web 145 is configured to permit each of the side portions 122,124 to bend relative to the base portion 112, wherein a portion of the web 145 separates the plates 144 of the side portions 122,124 from the plate 144 of the base portion 112. In this regard, the edges 130,132 where the side portions 122,124 connect with the base portion 112 of the collapsible pan 110 may function as a hinge about which the side portions 122,124 may pivot. Additionally, the attachment pins 120 may be composed of the same synthetic polymer material as the web 145.

Additionally, the absence of plates along the edges 130,132 of the collapsible pan 110, thereby leaving the web 145 as the exposed surface, facilitates greater heat along the edges 130, 132 during baking Higher heat along the edges 130,132 provides the food item being baked with crisp corner edges where the food item is in contact with the edges 130,132 of the collapsible pan 110 during baking Crisp corners in food items such as cakes and bread loaves typically complement the overall baking process, whereby the baked food item can be removed from the collapsible pan 110 with greater ease.

The plates 144 may be attached to the web 145 in a variety of ways, including mechanical bonding, chemical bonding, or a combination thereof. The plates 144 may be connected to the web 145 with an adhesive or other bonding agent. While a range of adhesive materials may be used, the adhesive is preferably selected so as to be functional in a high heat environment such as would be common in a baking oven. It is also contemplated that the web 145 may be attached to the plates 144 by mechanical methods such as snap-fitting or buttoning. Additionally, the web 145 may be molded over or around the plates 144. In a preferred embodiment, the web 145 is comprised of a silicone-based polymer that is injection molded around the plates 144 by an overmolding process. In another preferred embodiment, the web 145 is comprised of a silicone-based polymer that is molded with the plates 144 by a co-molding process.

As shown in FIGS. 21-22, the connection tabs 118 extend between the ends of the side portions 122,124. In a preferred embodiment, the connection tabs 118 may be of the same material as the web 145 and may be integral therewith. As further shown in FIGS. 21-22, two apertures 136 are arranged in each of the connection tabs 118. When configured for attachment to an attachment pin 120, each connection tab 118 is folded over upon itself such that the two apertures 136 are aligned with one another. The folded connection tab 118 may then be placed against the corresponding attachment pin 120 of the oppositely positioned side portions 122 such that the attachment pin extends through both of the apertures 136 of the connection tab 118. When the attachment pins 120 are placed within the corresponding apertures 136 of the connection tabs 118, the collapsible pan 110 is converted from the collapsed configuration to the use configuration. As shown in FIGS. 17-20, the side portions 122,124 bend along the edges 130,132 where each is connected with the base portion 112 to be in a generally upright position to define four walls of the collapsible pan 110. Because each edge 130,132 also represents an intersection between adjacent plates 144, the edges 130,132 function as a hinge about which the side portions 122,124 may pivot to be adjusted between the collapsed configuration and the use configuration.

As shown in FIGS. 17-22, the side portions 122,124 are releasably attached to one another by means of an attachment pin 120 configured for placement in corresponding apertures 136 of the connection tabs 118. It is also contemplated that other mechanisms of attachment may be used to attach the side portions 122,124 together, including, but not limited to clasps, snaps, clips, buttons and pressure fit holes.

The collapsible pan 110 may also be released quickly to permit adjustment from the use configuration to the collapsed configuration. The material used to form the web 145, such as a silicone-based polymer, may be configured to provide the collapsible pan 110 with a tendency to lay flat in the collapsed configuration. As such, when the side portions 122,124 are attached together when the collapsible pan 110 is in the use configuration, tension exists along edges 130,132 that urges the side portions 122,124 to adjust downward to lay flat relative to the base portion 112. Placement of the attachment pins 120 in corresponding apertures 136 of the connection tabs 118 provides sufficient structure to the collapsible pan 110 to overcome the natural tension along edges 130,132, thereby preventing the collapsible pan 110 from collapsing during baking Once baking is complete, the natural tension along edges 130,132 permits the collapsible pan 110 to be quickly released from the use configuration to the collapsed configuration. An inward pushing force applied to both side portions 122 of the collapsible pan 110 removes the attachment pins 120 from the corresponding apertures 136 of the connection tabs 118, thereby permitting the natural tension in the baking surface to pull the side portions 122,124 downward to lay generally flat relative to the base portion 112. In this manner, once baking is complete, the collapsible pan 110 may be quickly and easily converted from the use configuration to the collapsed configuration, thereby leaving the baked food item resting on the base portion 112 and free from the side portions 122,124. Accordingly, the baked food item may be removed easily from the collapsible pan 110, and the collapsible pan 110 may be cleaned and prepared for storage.

Advantageously, because the collapsible pan 110 in the collapsed configuration provides a flat, relatively seamless surface, the collapsible pan 110 does not have difficult-to-reach corners as in conventional pans, where crumbs and grime typically accumulate in a pan after use. In this regard, the collapsible pan 110 in the collapsed configuration is easier to clean than known pans. Additionally, when in the collapsed configuration, the collapsible pan 110 has a relatively flat shape and, thus, may be more easily placed into a conventional dishwasher.

Figure 23:
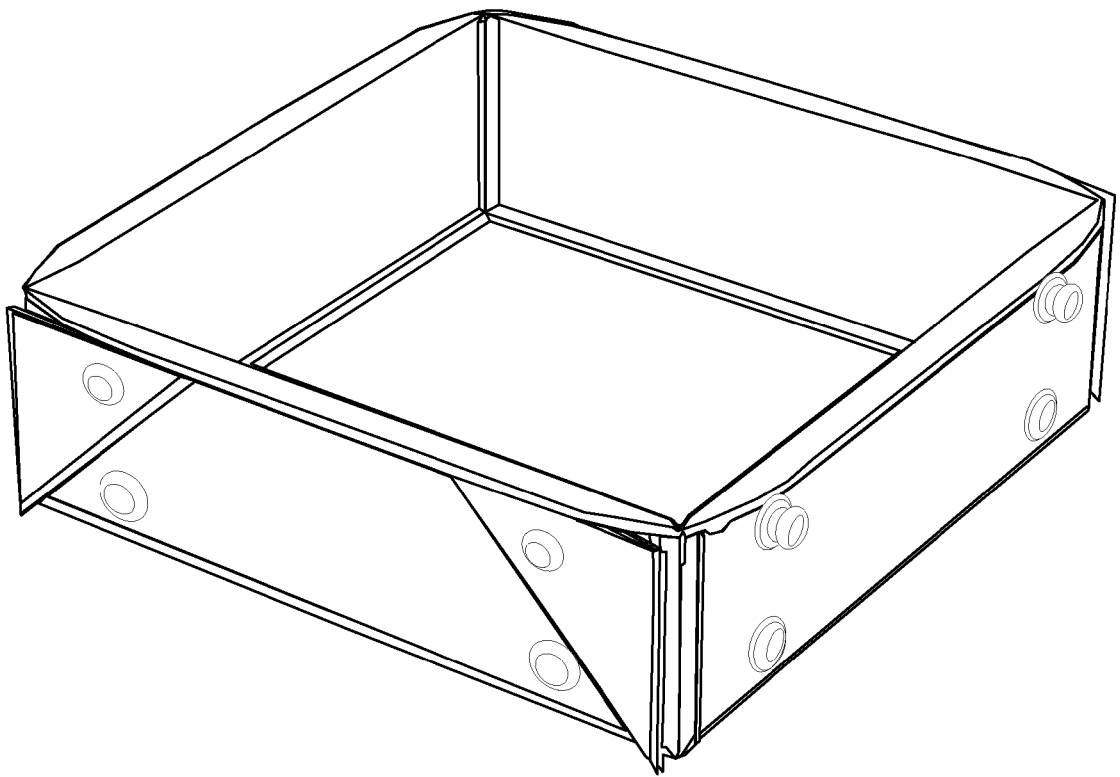
FIG. 23 is a perspective view of a third embodiment of a collapsible pan in accordance with one or more preferred embodiments of the present invention.
Figure 24:
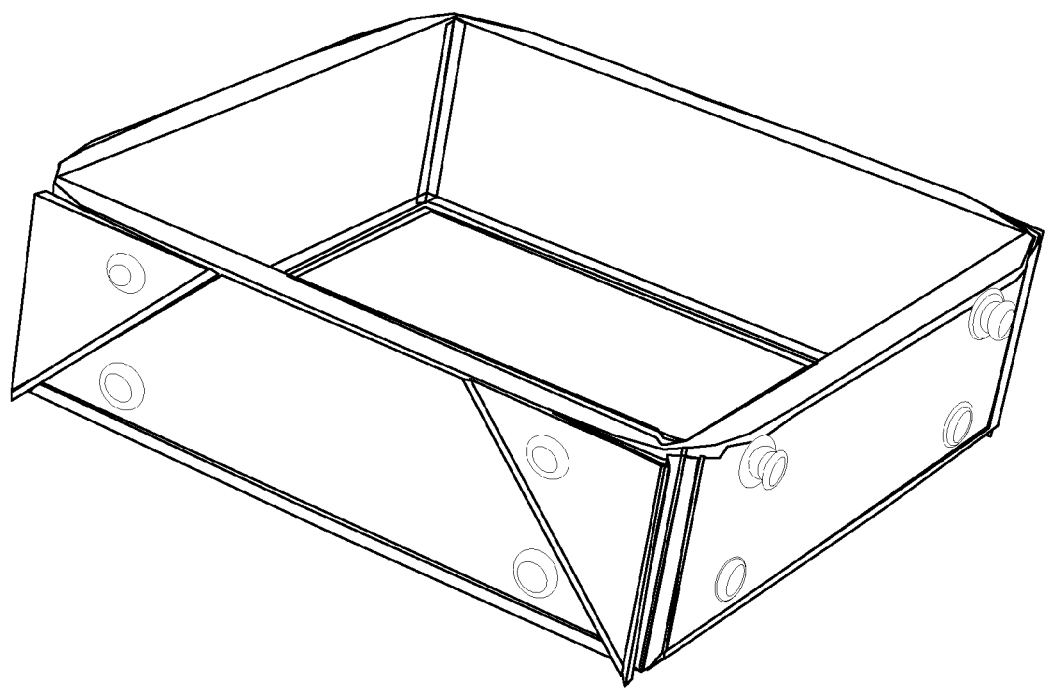
FIGS. 24-25 are views of the collapsible pan of FIG. 23, shown in a use configuration.
Figure 25:
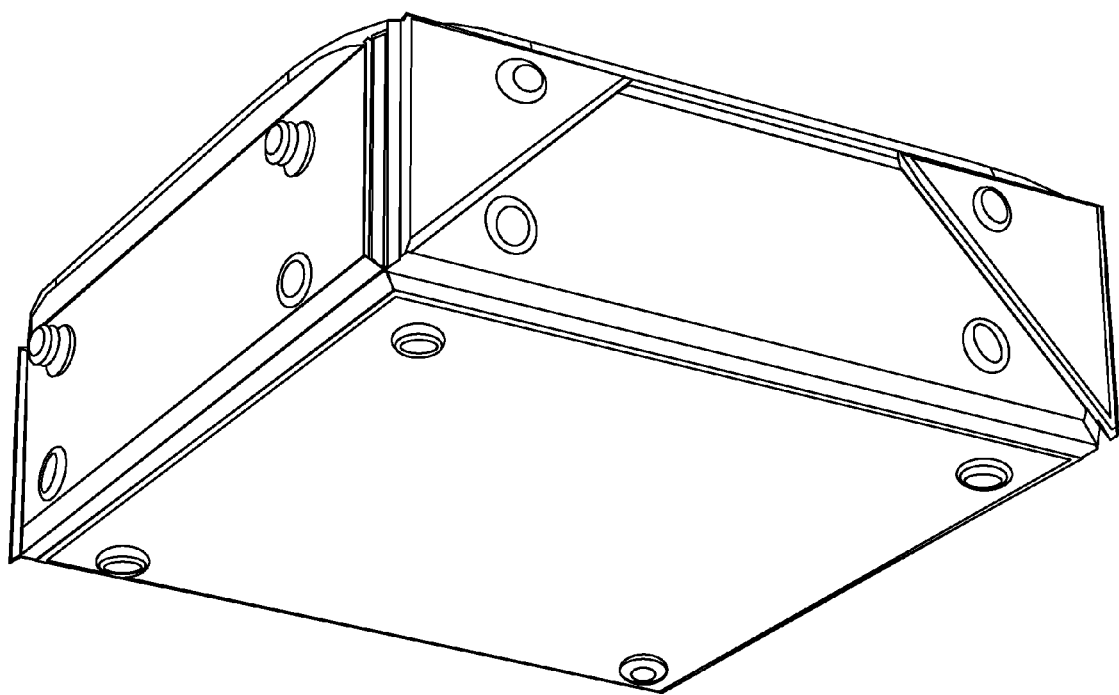
Figure 26:
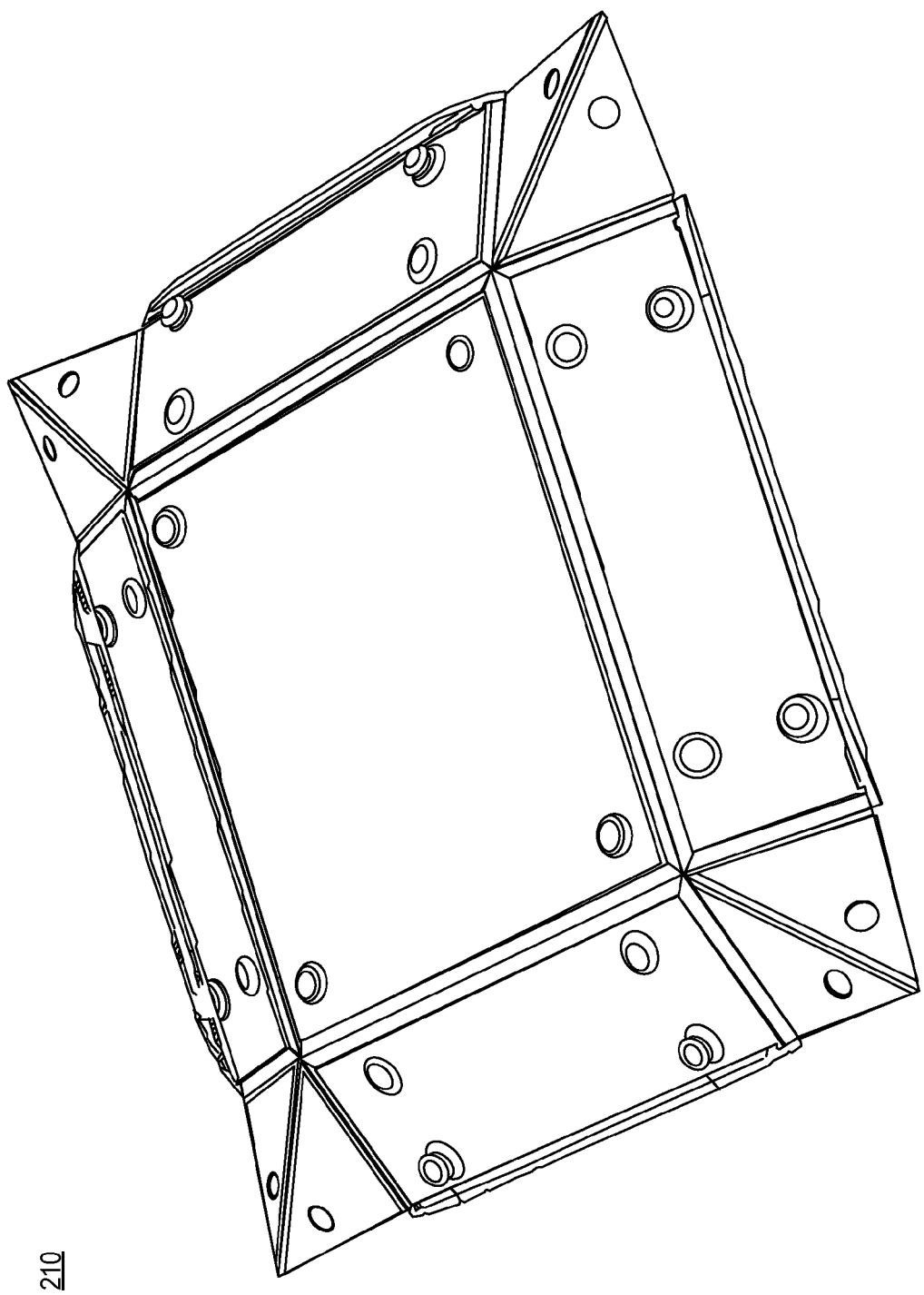
FIG. 26-28 are views of the collapsible pan of FIG. 23, shown in a collapsed configuration.
Figure 27:
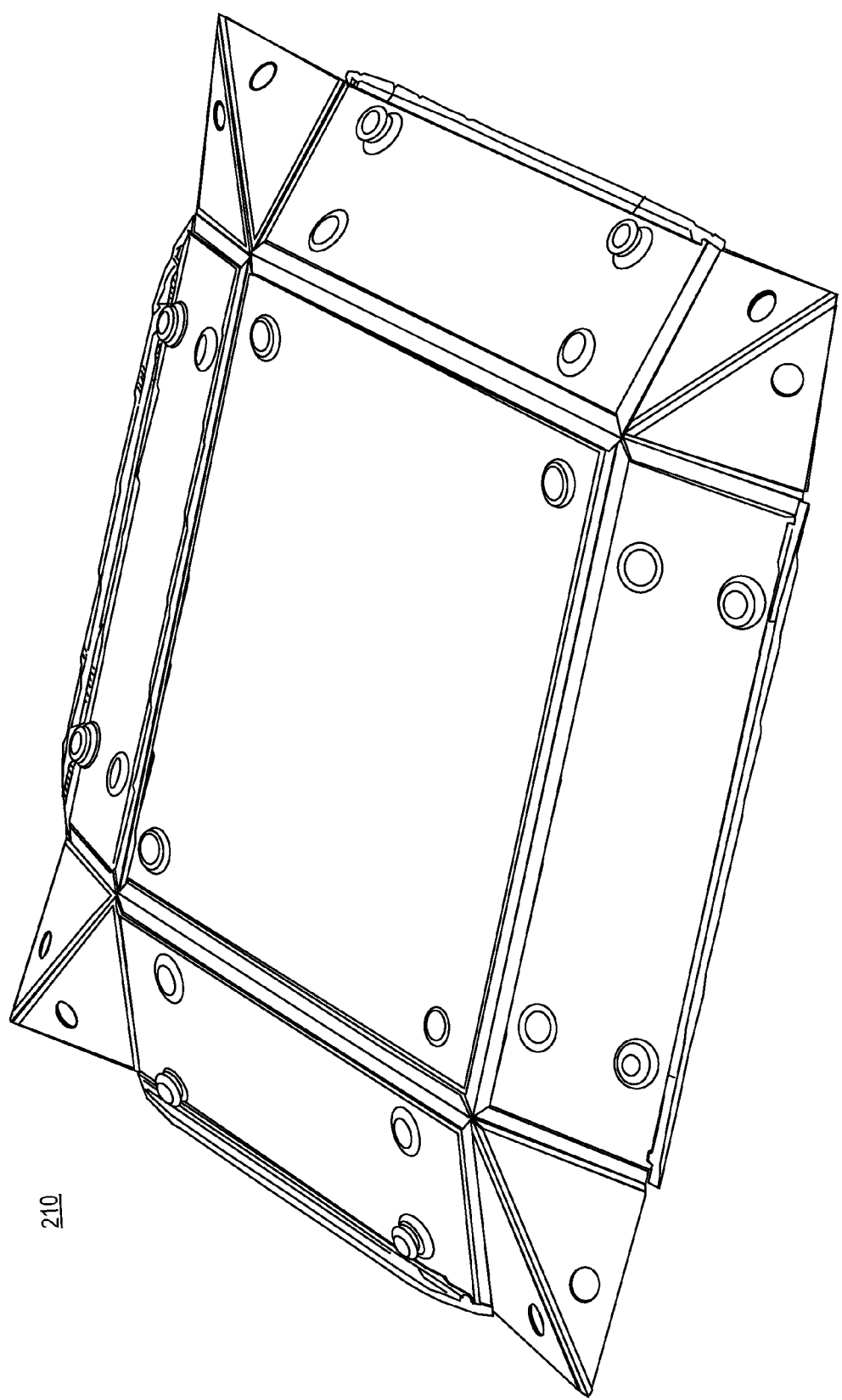
Figure 28:
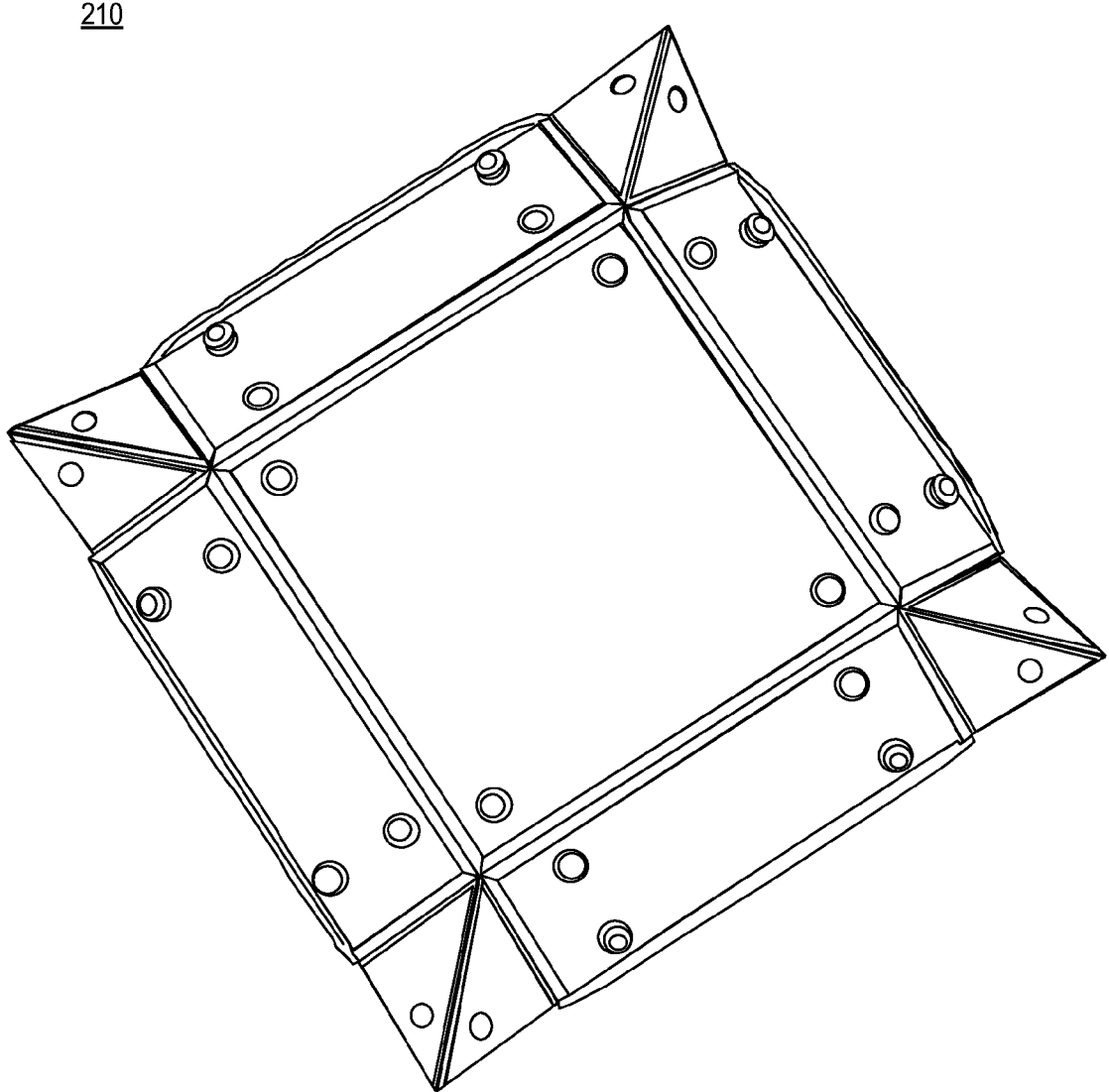

FIG. 23 is a perspective view of a third embodiment of a collapsible pan 210 in accordance with one or more preferred embodiments of the present invention. FIGS. 24-25 are views of the collapsible pan 210 of FIG. 23, shown in a use configuration. FIG. 26-28 are views of the collapsible pan 210 of FIG. 23, shown in a collapsed configuration. In design and function, the collapsible pan 210 is similar to the collapsible pan 110 depicted in FIGS. 17-22.

Figure 29:
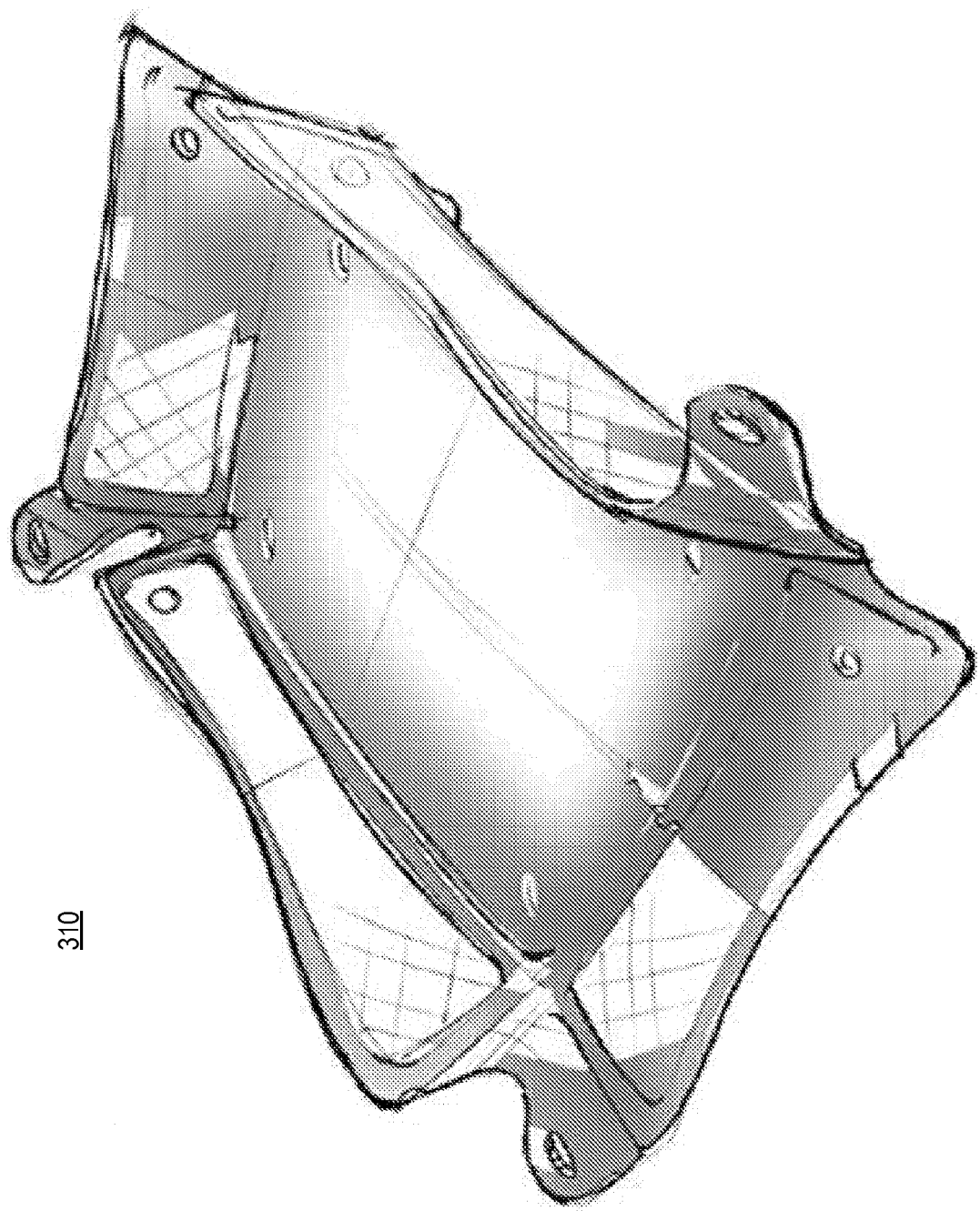
FIG. 29 is a perspective view of a fourth embodiment of a collapsible pan in accordance with one or more preferred embodiments of the present invention.

FIG. 29 is a perspective view of a fourth embodiment of a collapsible pan 310 in accordance with one or more preferred embodiments of the present invention. In accordance with one or more aspects, the collapsible pan 310 may be manufactured with a metal material that is insert-molded to form the rigid plates and a silicone-based polymer that is overmolded over the plates to form the flexible web.

Figure 30:
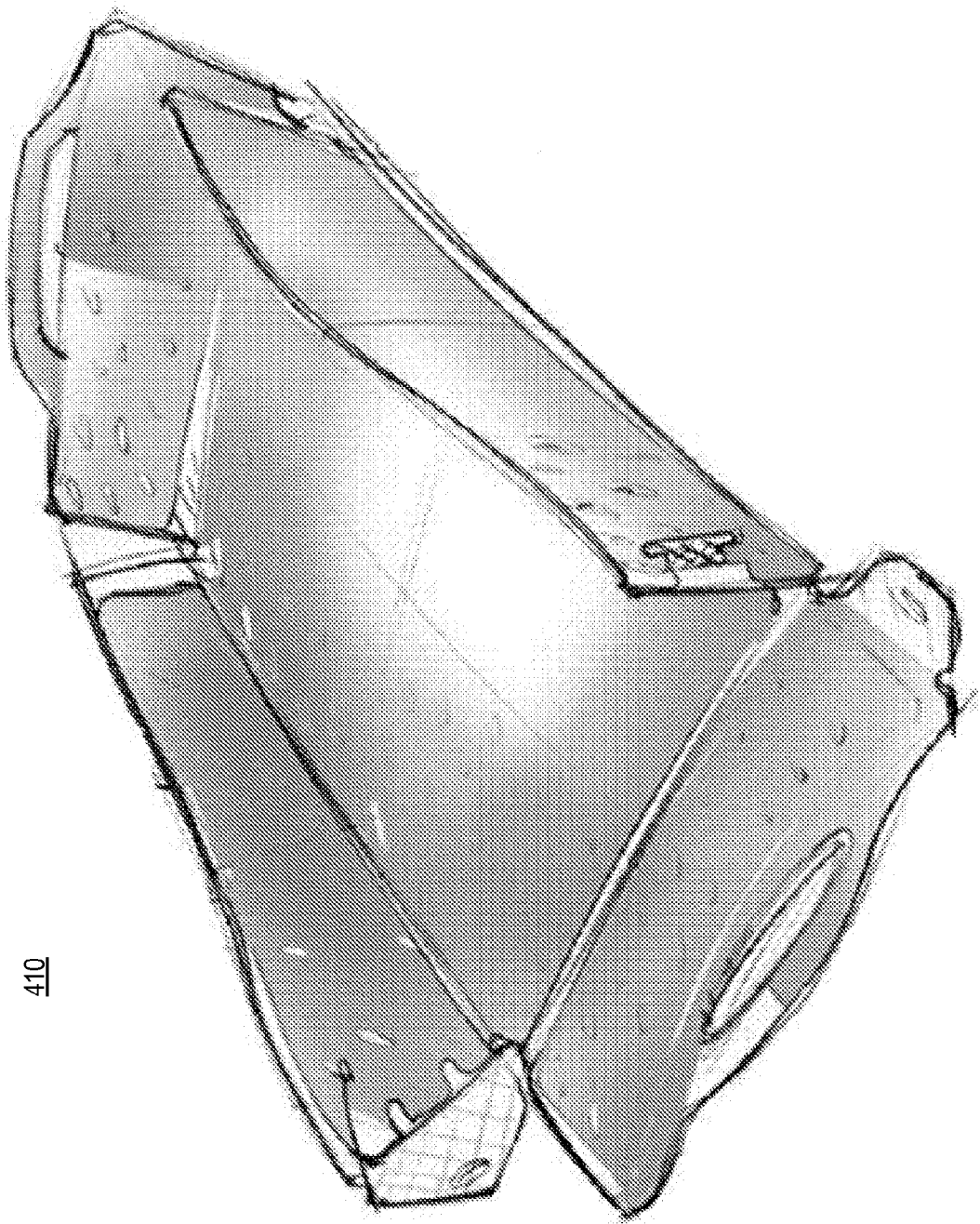
FIG. 30 is a perspective view of a fifth embodiment of a collapsible pan in accordance with one or more preferred embodiments of the present invention.

FIG. 30 is a perspective view of a fifth embodiment of a collapsible pan 410 in accordance with one or more preferred embodiments of the present invention. In accordance with one or more aspects, the collapsible pan 410 may be manufactured with a metal material that is insert-molded to form the rigid plates and a silicone-based polymer that is co-molded with the plates to form the flexible web. The co-molding process may enhance the bond between the plates and the web. In a preferred embodiment, the metal material may be a perforated metal. The collapsible pan 410 may further include slotted handle grips by which the pan may be grasped by a user.

Figure 31:
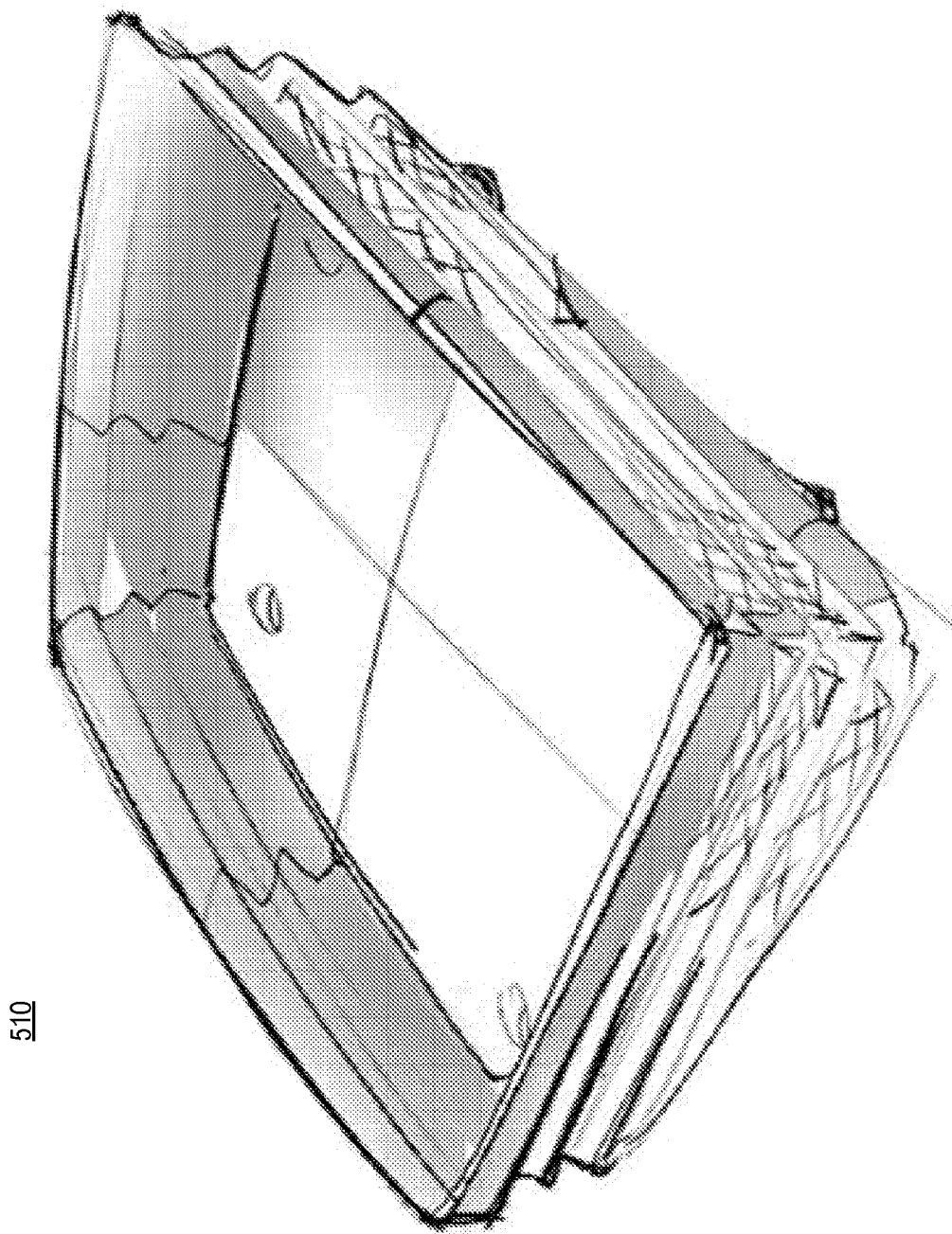
FIG. 31 is a perspective view of a sixth embodiment of a collapsible pan in accordance with one or more preferred embodiments of the present invention.

FIG. 31 is a perspective view of a sixth embodiment of a collapsible pan 510 in accordance with one or more preferred embodiments of the present invention. In accordance with one or more aspects, the collapsible pan 510 may be manufactured with metal-based, die cut banding that is insert-molded and a silicone-based polymer that is overmolded over the metal banding. In this regard, the metal banding provides rigidity to the collapsible pan 510 and permits the collapsible pan 510 to be collapsed in an accordion-like manner.

Figure 32:
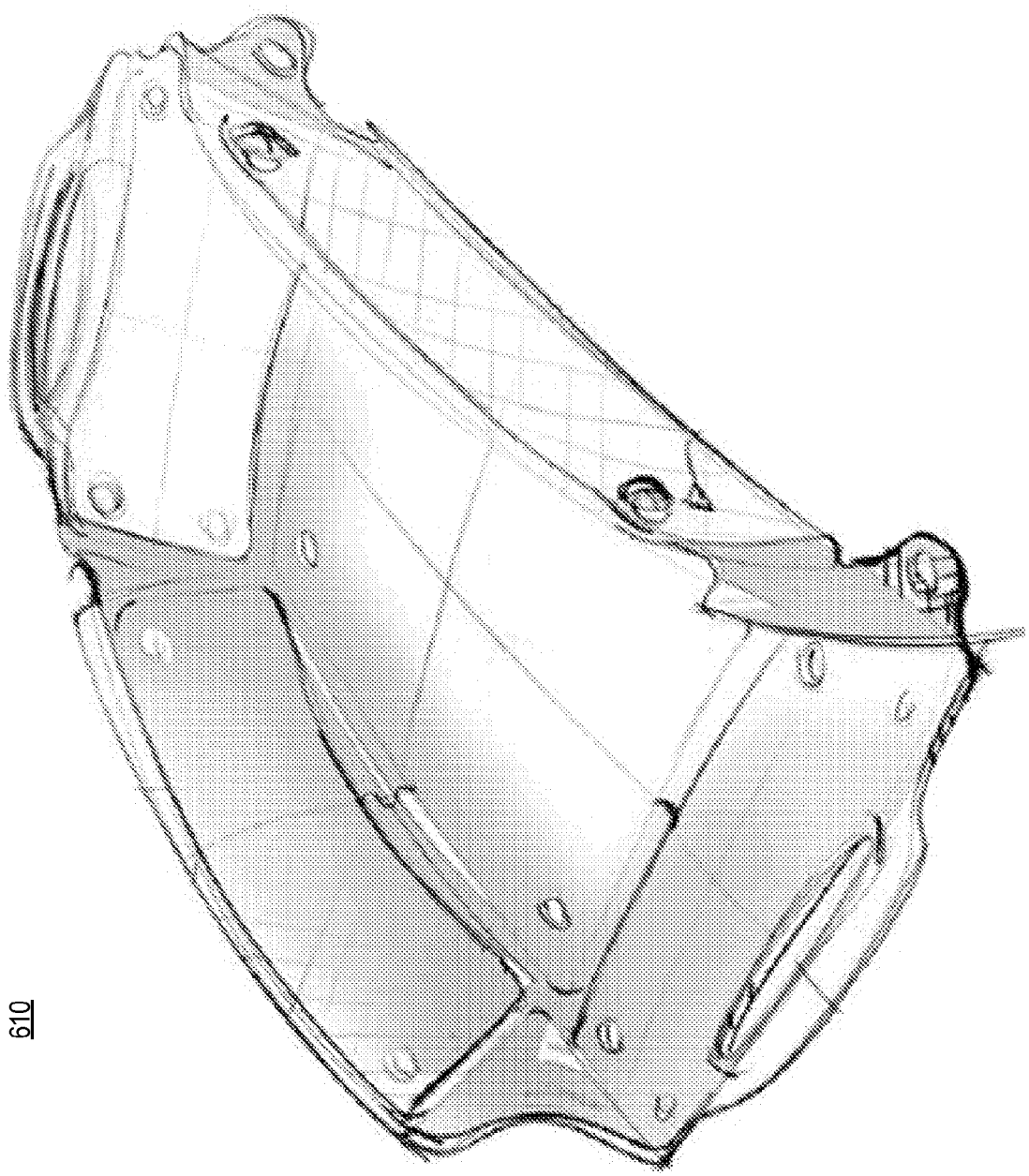
FIG. 32 is a perspective view of a seventh embodiment of a collapsible pan in accordance with one or more preferred embodiments of the present invention.

FIG. 32 is a perspective view of a seventh embodiment of a collapsible pan 610 in accordance with one or more preferred embodiments of the present invention. In accordance with one or more aspects, the collapsible pan 610 may be manufactured with die cut metal panels and a mechanically-bonded silicone sheet that is attached to the metal panels with push through snap fittings or button locks. In this regard, flaps extending from oppositely-positioned side portions of the collapsible pan 610 may be button locked to adjoining side portions in order to assemble the pan in the use configuration. The collapsible pan 610 may further include slotted handle grips by which the pan may be grasped by a user.

Figure 33:
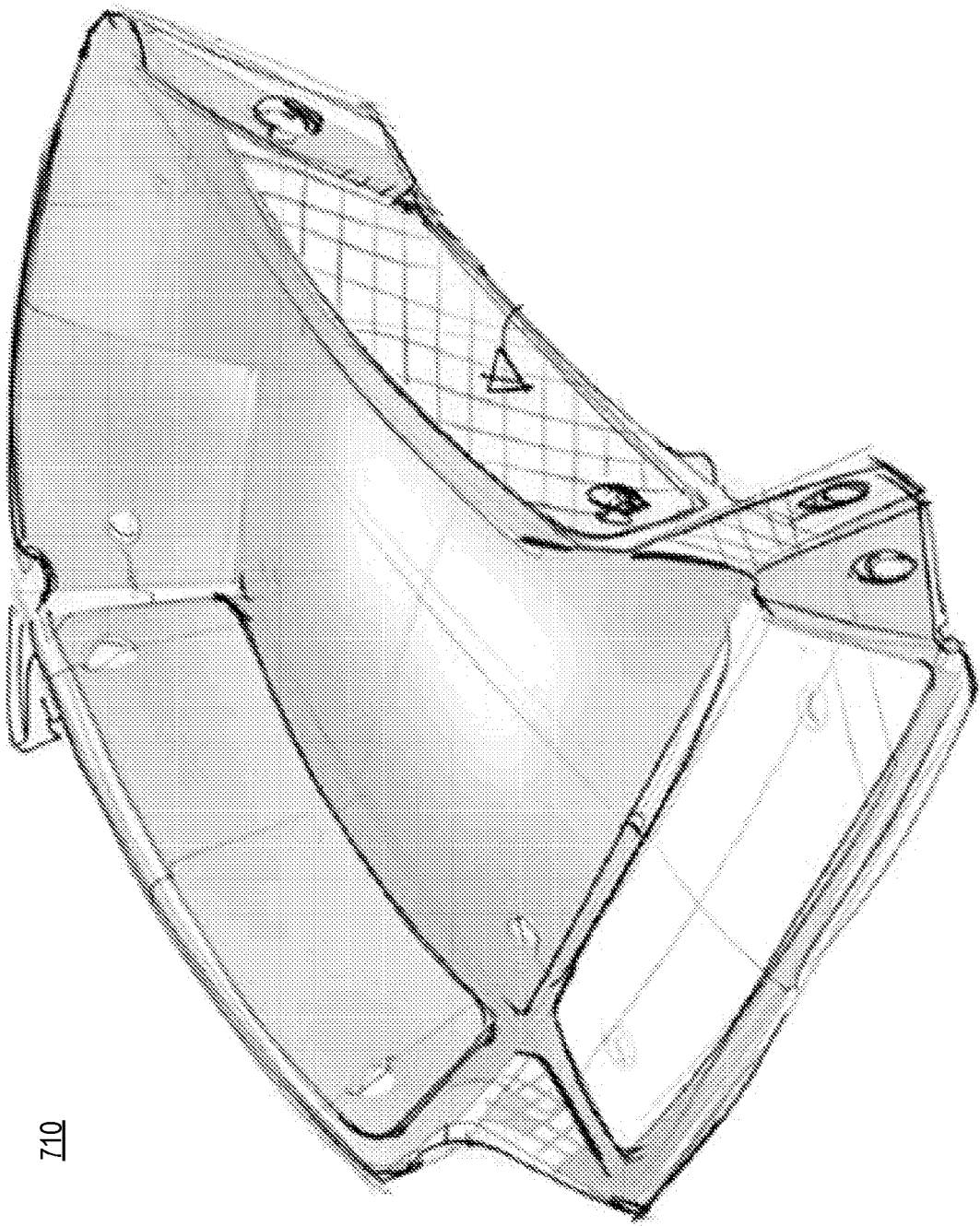
FIG. 33 is a perspective view of a eighth embodiment of a collapsible pan in accordance with one or more preferred embodiments of the present invention.

FIG. 33 is a perspective view of an eighth embodiment of a collapsible pan 710 in accordance with one or more preferred embodiments of the present invention. In accordance with one or more aspects, the collapsible pan 710 may be manufactured with die cut metal panels and a mechanically-bonded silicone sheet that is attached to the metal panels with push through snap fittings or button locks. Each connection tab extending between adjacent side portions may be folded back upon itself and buttoned or snap fit to a side portion to seal the corners of the collapsible pan 710.

Figure 34:
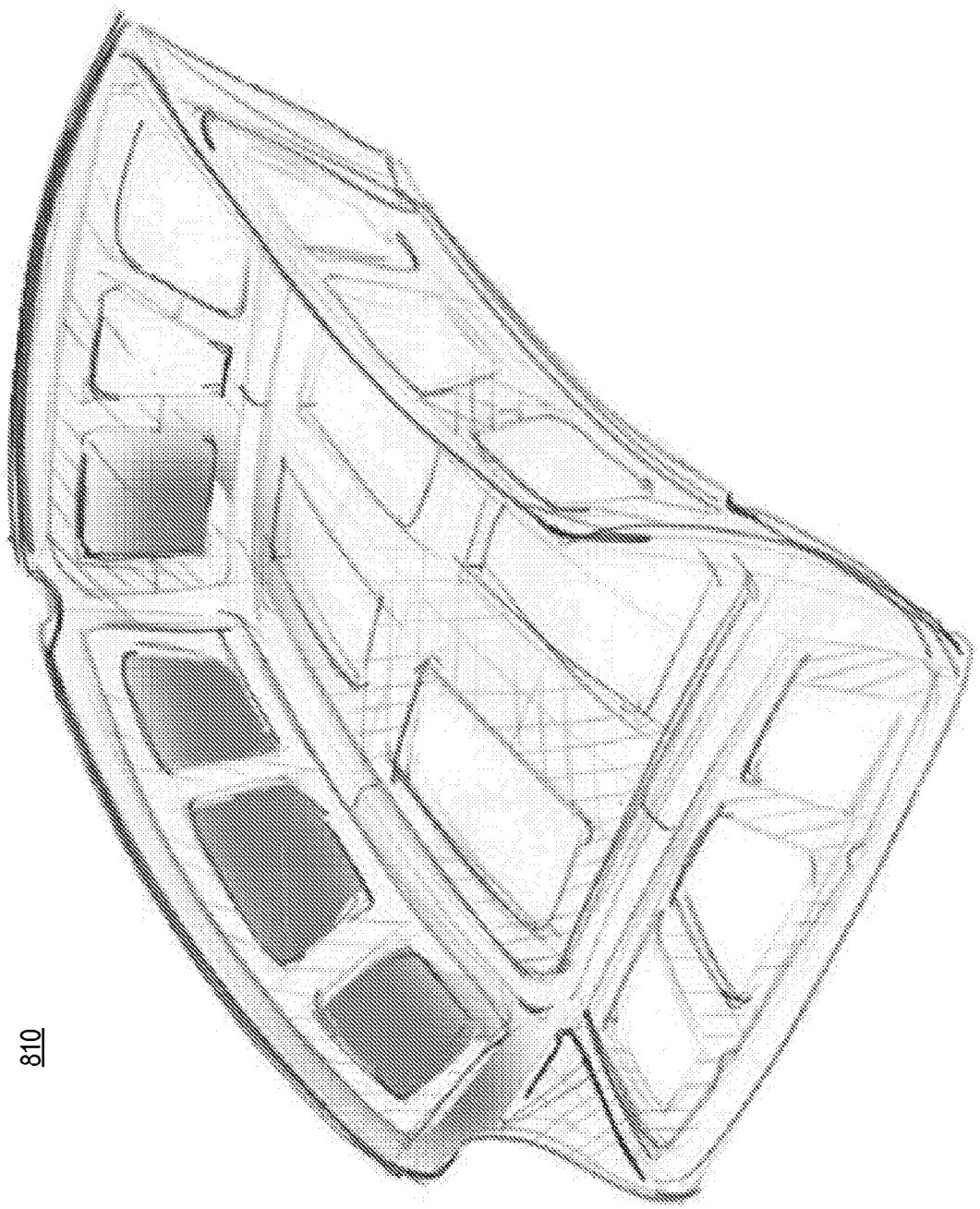
FIG. 34 is a perspective view of an ninth embodiment of a collapsible pan in accordance with one or more preferred embodiments of the present invention.

FIG. 34 is a perspective view of a ninth embodiment of a collapsible pan 810 in accordance with one or more preferred embodiments of the present invention. In accordance with one or more aspects, the collapsible pan 810 may be manufactured with an insert-molded die cut armature metal material to form the rigid plates and a silicone-based polymer that is co-molded with the plates to form the flexible web. The co-molding process may enhance the bond between the plates and the web. In a preferred embodiment, edges and corners where the side portions intersect with the base portion may be inverted after use of the collapsible pan 810 in order to aid in the cleaning process. Inverting the collapsible pan 810 may enhance access to such edges and corners that may otherwise be difficult to reach.

Figure 35:
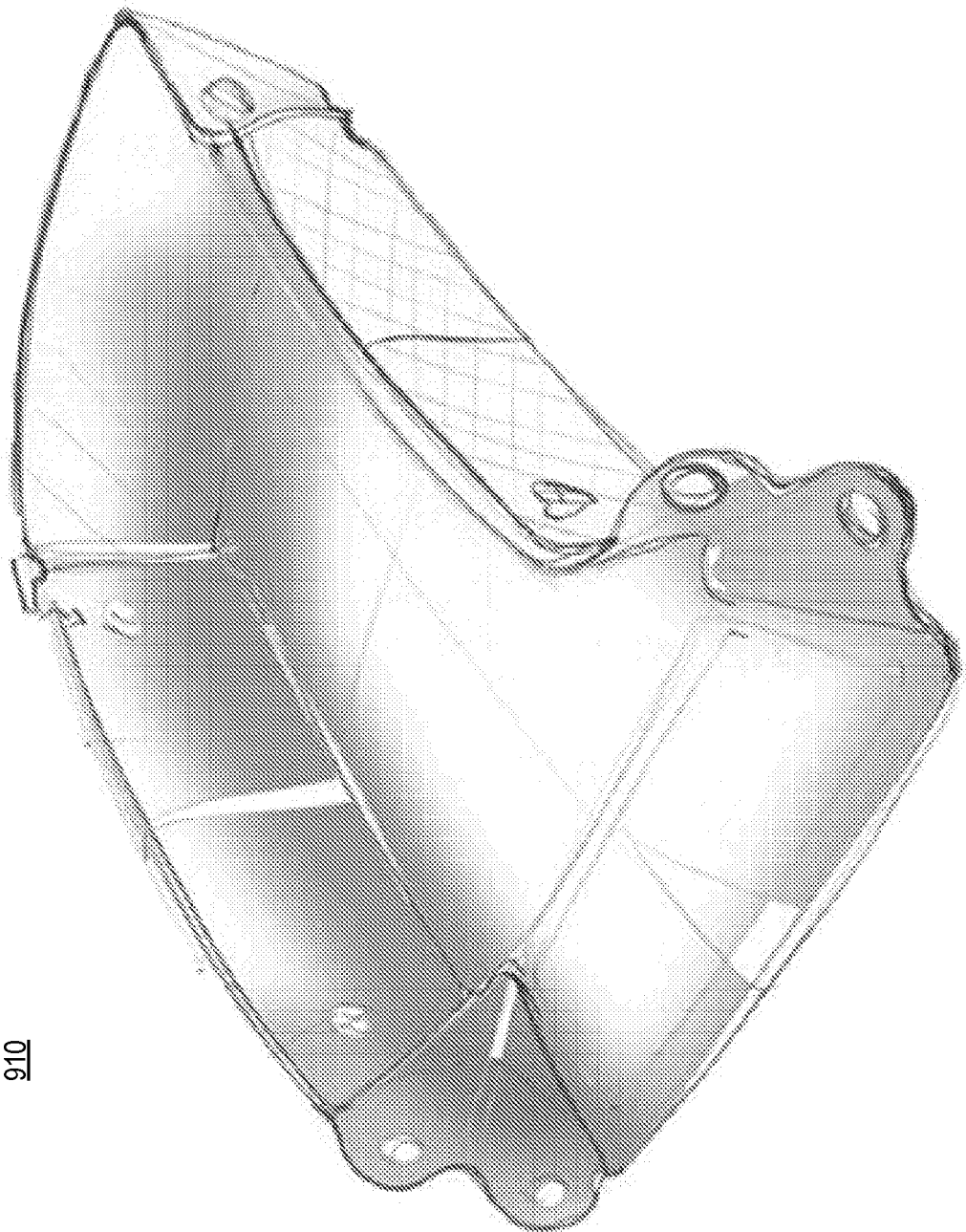
FIG. 35 is a perspective view of a tenth embodiment of a collapsible pan in accordance with one or more preferred embodiments of the present invention.

FIG. 35 is a perspective view of a tenth embodiment of a collapsible pan 910 in accordance with one or more preferred embodiments of the present invention. In accordance with one or more aspects, the collapsible pan 910 may be manufactured with die cut metal panels and a mechanically-bonded silicone sheet that is attached to the metal panels with push through snap fittings or button locks. In this regard, flaps extending from oppositely-positioned side portions of the collapsible pan 910 may be button locked to adjoining side portions in order to assemble the pan in the use configuration. In a preferred embodiment, attachment pins at the side portions of the collapsible pan 910 for use in assembling the collapsible pan 910 in the use configuration may be configured to have a particular shape, such as a heart shape.

Figure 36:
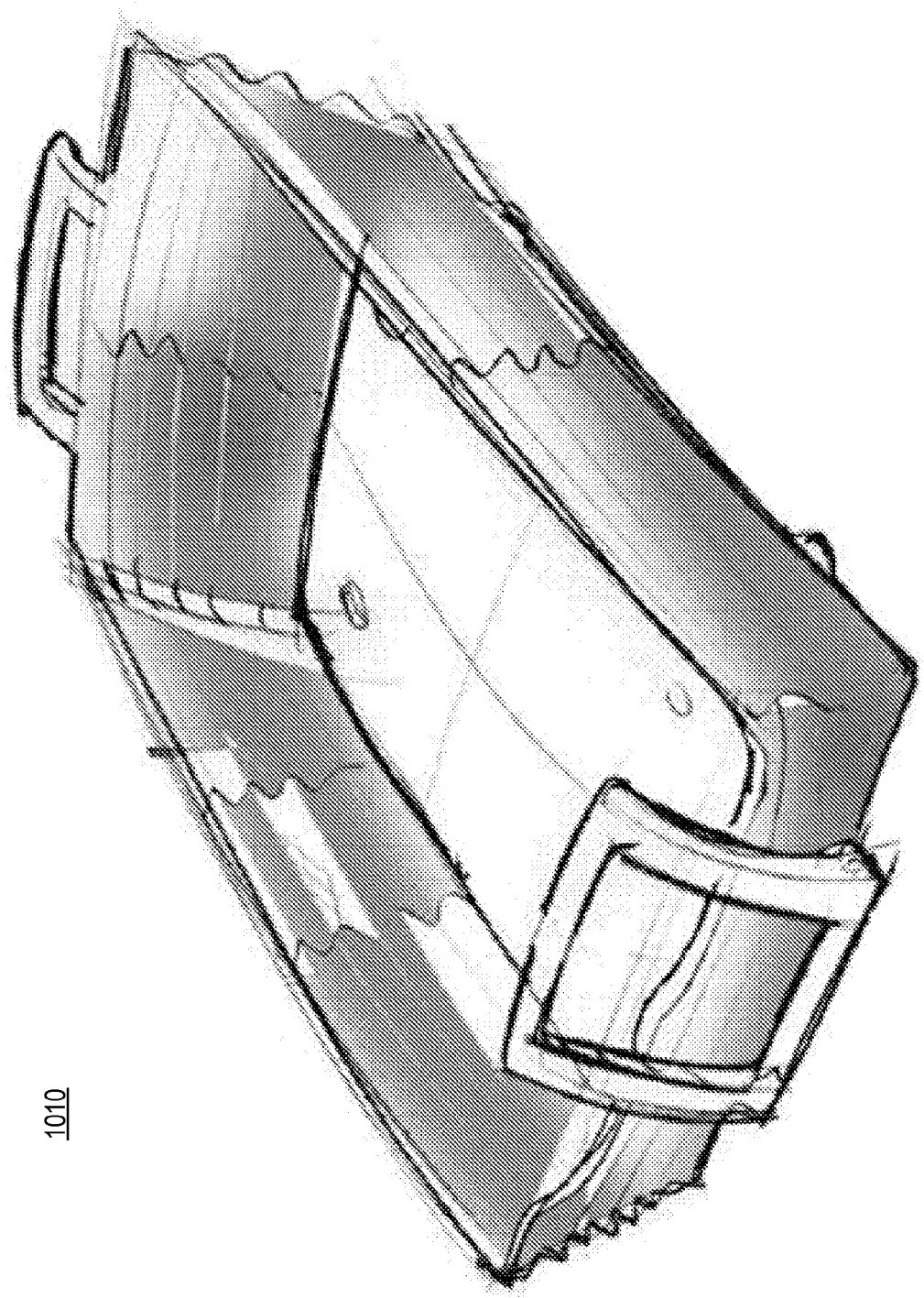
FIG. 36 is a perspective view of a eleventh embodiment of a collapsible pan in accordance with one or more preferred embodiments of the present invention.

FIG. 36 is a perspective view of an eleventh embodiment of a collapsible pan 1010 in accordance with one or more preferred embodiments of the present invention. In accordance with one or more aspects, the collapsible pan 1010 may have an insert-molded base plate and metal-based armature at the side plates that permits the side plates to be collapsed relative to the base plate in an accordion-like manner. The web may be incorporated with the collapsible pan 1010 as a co-molded silicone-based polymer. The collapsible pan 1010 may further include handle grips that are hingedly attached at the sides of the pan to permit each grip to pop up when the collapsible pan 1010 is in the use configuration.

Figure 37:
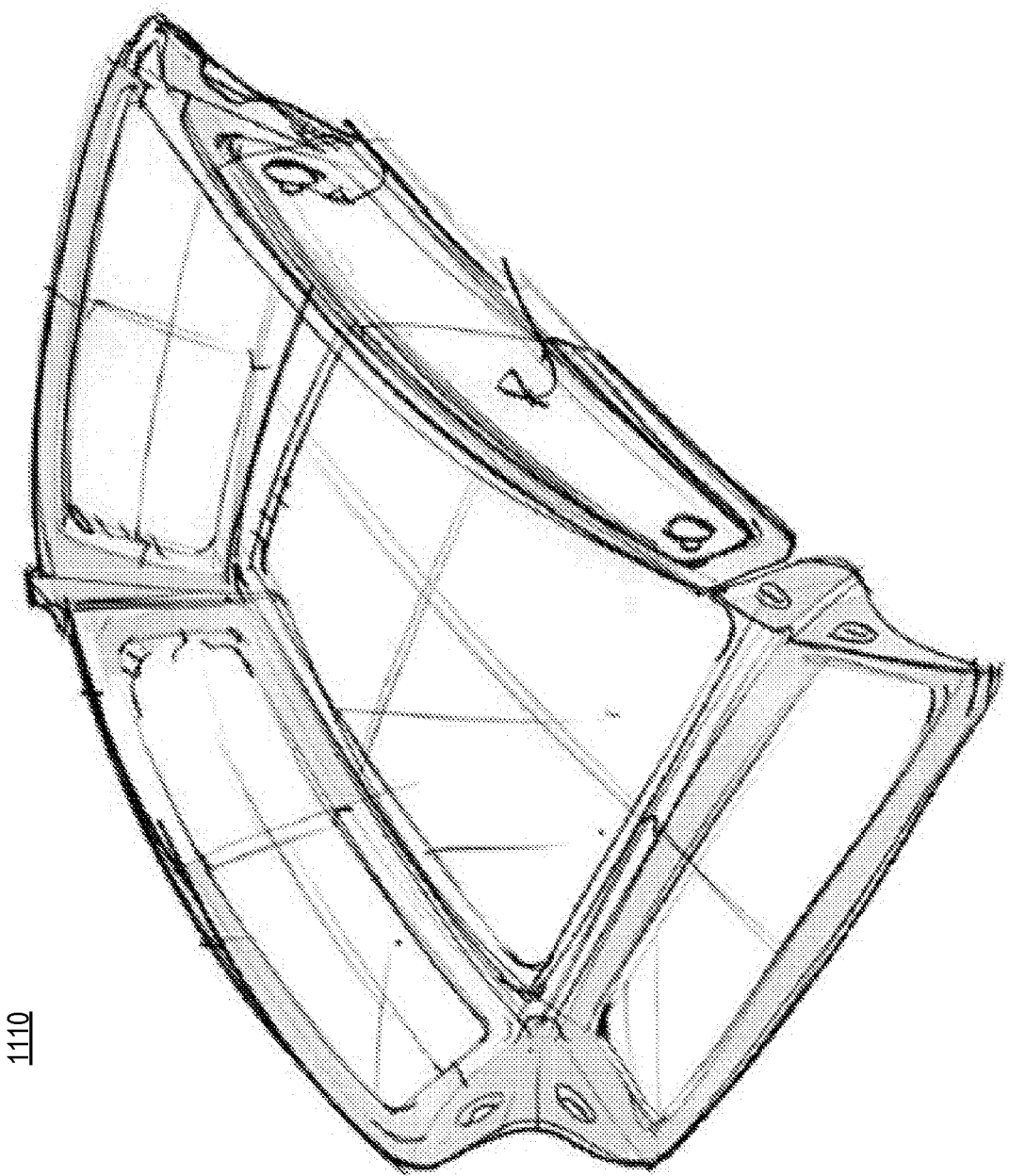
FIG. 37 is a perspective view of a twelfth embodiment of a collapsible pan in accordance with one or more preferred embodiments of the present invention.

FIG. 37 is a perspective view of a twelfth embodiment of a collapsible pan 1110 in accordance with one or more preferred embodiments of the present invention. In accordance with one or more aspects, the collapsible pan 1110 may be manufactured with a web that is injection molded with a silicone-based polymer arranged as a gasket having a plurality of cavities. Plates in the form of die cut metal sheets may be adhered or mechanically fastened relative to the web. The silicone-based polymer of the web may thereby provide the collapsible pan 1110 with flexibility at the ends of the plates in order to facilitate folding of the connection tabs to seal and close off the corners of the pan when in the use configuration.

Based on the foregoing description, it will be readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention. Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements, the present invention being limited only by the claims appended hereto and the equivalents thereof.

What is claimed is:

1. A collapsible pan comprising:
   a. a base portion;
   b. a plurality of side portions; and
   c. a flexible connector comprised of a silicone-based polymer, for connecting each of the side portions to the base portion along edges thereof;
   d. wherein each of the plurality of side portions is configured to be pivotable relative to the base portion, thereby permitting adjustment between a use configuration, whereby each of the plurality of side portions is arranged generally upright relative to the base portion, and a collapsed configuration, whereby each of the plurality of side portions is arranged to lay generally flat relative to the base portion; and
   e. wherein the base portion and the plurality of side portions each include a plate comprised of a metal-based material.

2. The collapsible pan of claim 1, wherein the metal-based material includes aluminum.

3. The collapsible pan of claim 1, further comprising a plurality of tabs at opposite ends of at least some of the plurality of side portions for attaching adjacent side portions together in the use configuration.

4. The collapsible pan of claim 3, wherein adjacent side portions are releasably attached together when in the use configuration so as to permit quick release of the tabs, thereby freeing the plurality of side portions for pivotable adjustment.

5. A collapsible pan comprising:
   a. a base plate;
   b. a plurality of side plates; and
   c. a flexible web comprised of a silicone-based polymer, connecting each of the plurality of side plates to the base plate along edges thereof;
   d. wherein the flexible web facilitates pivotable movement of each of the plurality of side plates relative to the base plate, thereby permitting adjustment between a use configuration, whereby each of the plurality of side plates is arranged generally upright relative to the base plate, and a collapsed configuration, whereby each of the plurality of side plates is arranged to lay generally flat relative to the base plate; and
   e. wherein the base plate and the plurality of side plates are comprised of a metal-based material.

6. The collapsible pan of claim 5, wherein the metal-based material includes aluminum.

7. The collapsible pan of claim 5, wherein the flexible web includes a plurality of tabs arranged between adjacent side plates for connecting adjacent side plates with one another.

8. The collapsible pan of claim 7, wherein each of the plurality of tabs is configured to fold upon itself and attach to one of the adjacent side plates so as to releasably secure the plurality of side plates in an upright position relative to the base plate when in the use configuration.

9. The collapsible pan of claim 5, wherein at least one of the base plate and the plurality of side plates is mechanically bonded to the flexible web.

10. The collapsible pan of claim 5, wherein at least one of the base plate and the plurality of side plates is chemically bonded to the flexible web.

* * * * *